(12) United States Patent
Peale et al.

(10) Patent No.: US 7,333,690 B1
(45) Date of Patent: Feb. 19, 2008

(54) EVANESCENT WAVEGUIDE COUPLERS

(75) Inventors: David R. Peale, San Diego, CA (US); Harald Hess, La Jolla, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 12 days.

(21) Appl. No.: 11/277,488

(22) Filed: Mar. 24, 2006

Related U.S. Application Data

(60) Provisional application No. 60/665,771, filed on Mar. 28, 2005.

(51) Int. Cl.
*G02B 6/26* (2006.01)
*G02B 6/42* (2006.01)
*G02B 6/28* (2006.01)

(52) U.S. Cl. .............. 385/30; 385/16; 385/17; 385/27; 385/31; 385/50

(58) Field of Classification Search .............. 385/30
See application file for complete search history.

(56) References Cited

U.S. PATENT DOCUMENTS

| | | | | |
|---|---|---|---|---|
| 4,932,735 | A * | 6/1990 | Koai ........................ | 385/17 |
| 5,044,715 | A * | 9/1991 | Kawachi et al. .......... | 385/42 |
| 5,170,451 | A * | 12/1992 | Ohshima ................... | 385/43 |
| 5,491,763 | A * | 2/1996 | van Deventer et al. ... | 385/24 |
| 5,636,300 | A * | 6/1997 | Keck et al. ............... | 385/24 |
| 5,832,155 | A * | 11/1998 | Rasch et al. .............. | 385/48 |
| 5,862,276 | A * | 1/1999 | Karras ...................... | 385/30 |
| 6,084,992 | A * | 7/2000 | Weber et al. ............. | 385/24 |
| 6,583,917 | B2 * | 6/2003 | Melloni et al. ........... | 359/245 |
| 6,687,008 | B1 | 2/2004 | Peale et al. | |
| 6,922,507 | B2 * | 7/2005 | Doerr ........................ | 385/39 |
| 6,950,581 | B2 * | 9/2005 | Bandyopadhyay ......... | 385/42 |
| 2002/0159690 | A1 * | 10/2002 | Lupu et al. ................ | 385/24 |
| 2004/0126072 | A1 * | 7/2004 | Hoon Lee et al. ........ | 385/122 |

OTHER PUBLICATIONS

Fuest et al., "Interferometric displacement sensor realized with a planar 3×3 directional coupler in glass," SPIE, vol. 1794, 1992, pp. 352-365.

Stowe et al., "Demodulation of interferometric sensors using a fiber-optic passive quadrature demodulator," Journal of Lightwave Technology, vol. LT-1, No. 3, Sep. 1983, pp. 519-523.

Travis et al., "Possible fused fibre in-phase/quadrature measuring multiport," Electronics Letters, vol. 21, No. 21, Oct. 10, 1985, pp. 954-955.

Niemeier et al., "Quadrature outputs from fiber interferometer with 4×4 coupler," Optics Letters, vol. 11, No. 10, Oct. 1986, pp. 677-679.

Sheem, "Optical fiber interferometers with [3×3] directional couplers: Analysis," J. Appl. Phys., vol. 52, No. 6, Jun. 1981, pp. 3865-3872.

Michechkin et al., "Sol-gel-derived 4×4 multimode interference coupler: optimization and fabrication," Opt. Eng., vol. 43, No. 3, Mar. 2004, pp. 662-666.

* cited by examiner

*Primary Examiner*—Frank G. Font
*Assistant Examiner*—Ryan Lepisto
(74) *Attorney, Agent, or Firm*—Luedeka, Neely & Graham, P.C.

(57) ABSTRACT

A multi-port planar evanescent coupler having N inputs and M outputs, where both N and M are each no less than three, formed of combinations of at least one of at least one planar evanescent 2×2 coupler and at least one planar evanescent 3×3 coupler subunits, with phase shifting segments in selected waveguides disposed between the planar evanescent coupler subunits. The multi-port planar evanescent coupler can be used in phase measurement and detection devices, such as interferometers, optical receivers, and laser gyroscopes.

6 Claims, 22 Drawing Sheets

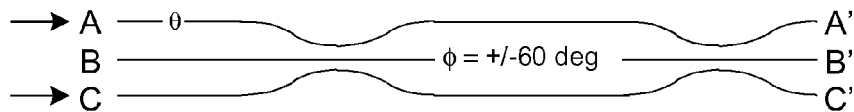
Fig. 17
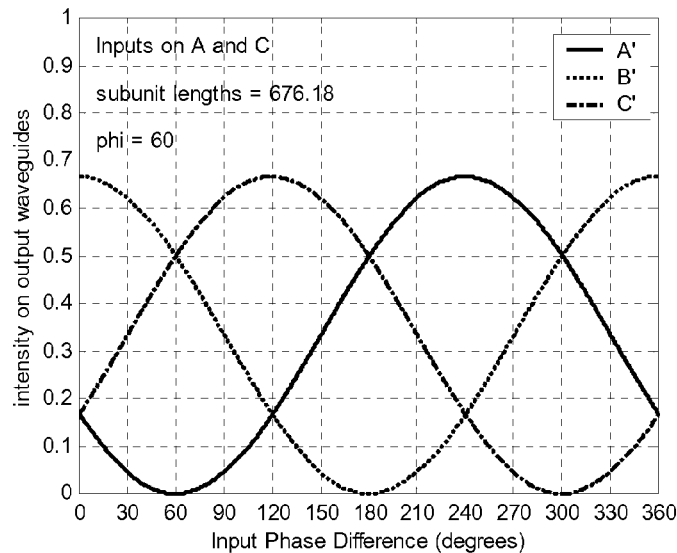
Fig. 18
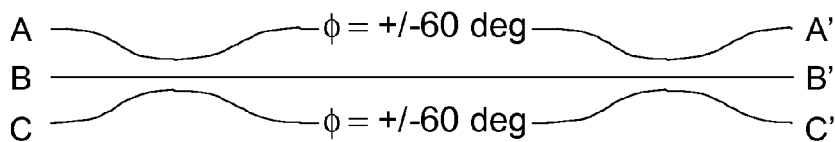
Fig. 19
| Phi (degrees) | splitting ratios |
|---|---|
| 0 | 44.5:11:44.5 |
| 37 | 40:20:40 |
| 45 | 38:24:38 |
| 60 | 33:33:33 |
| 70 | 30:40:30 |
| 82.7 | 25:50:25 |
| 95.7 | 20:60:20 |
| 123.4 | 10:80:10 |
| 140.8 | 5:90:5 |
| 162.7 | 1:98:1 |
Fig. 20

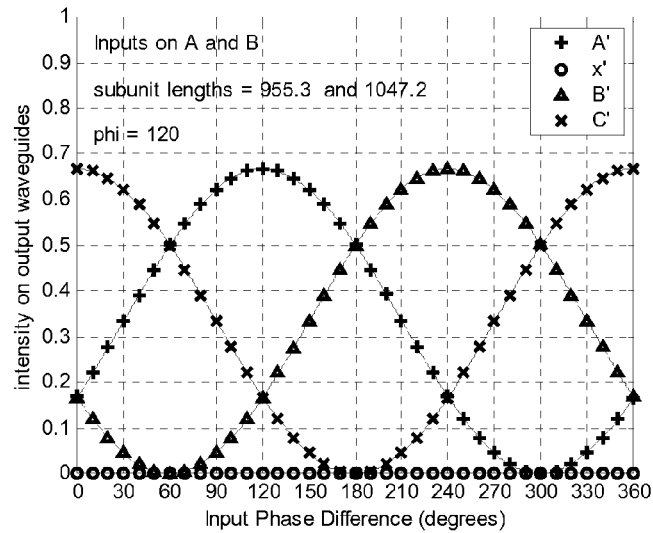
Fig. 43
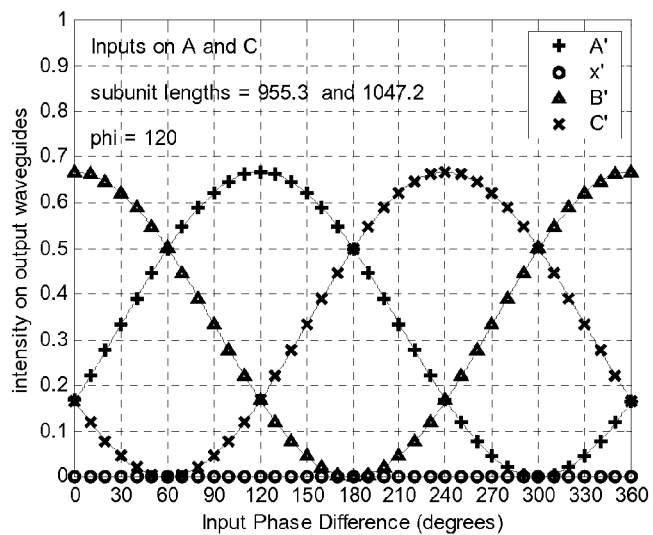
Fig. 44
| Phase phi | Center coupler length | Center coupler ratio | Resulting 3x3 splitting ratios |
|---|---|---|---|
| 171.4 | 151 | 97.7:2.3 | 1:98:1 |
| 160.45 | 342 | 88.8:11.2 | 5:90:5 |
| 151.75 | 494 | 77.5:22.5 | 10:80:10 |
| 144.53 | 620 | 66:33 | 15:70:15 |
| 137.90 | 736 | 55:45 | 20:60:20 |
| 131.52 | 848 | 43.8:56.2 | 25:50:25 |
| 124.85 | 964 | 32.5:67.5 | 30:40:30 |
| 120.00 | 1047.2 | 25:75 | 33:33:33 |
| 108.6 | 1250 | 10:90 | 40:20:40 |
| 90 | 1575 | 0:100 | 44:11:44 |
| 60 | 2095 | 25:75 | 33:33:33 |
Fig. 45

EVANESCENT WAVEGUIDE COUPLERS

CROSS-REFERENCE TO RELATED APPLICATIONS

This application claims priority based on now abandoned U.S. provisional patent application 60/665,771 filed on Mar. 28, 2005, which is hereby incorporated by reference in its entirety.

FIELD OF THE INVENTION

This invention generally relates to the field of optics. More particularly, this invention relates to waveguide couplers for differential phase measurement systems.

BACKGROUND

Determining the phase difference between two electromagnetic signals is a widely needed measurement applied in a very large number of applications. In many of these applications, the two electromagnetic signals are combined (or "mixed") in an apparatus that generates at its outputs one or more electromagnetic signals with an intensity that carries information about the phase difference between the two input signals.

Prior to the development of waveguide optics, mixing two electromagnetic signals was often performed using partially silvered mirrors, pellicles, or prisms. Now it is possible to combine two electromagnetic signals in an optical device called a 2×2 coupler. Electromagnetic signals delivered to the two input waveguides will interact and form superpositions of these signals on each of two output waveguides. The interaction can be created using evanescent coupling, multimode mixing, or waveguide branching.

In an evanescently coupled 2×2 coupler, the two input waveguides are brought close enough to each other to allow a portion of the electromagnetic radiation from either waveguide to transfer to the other waveguide. The amount of field transferred depends on the proximity of the two waveguides and how long the two waveguides remain close enough to transfer field energy. The region in which the waveguides are close enough together to allow a substantial amount of electromagnetic energy transfer is called the interaction region. An important aspect of this process is that the transfer of field energy from one waveguide to another imparts a ninety degree phase lag to the transferred field. The output signal intensities on each waveguide are then simply the square of the sum of these two electric field components within the waveguide.

This can be expressed mathematically as follows. The two input electric fields can be defined as $$E_a = Ae^{i\omega t}$$

$$E_b = Be^{i\omega t + \Delta}$$

A and B are the scalar magnitudes, ω is the field frequency, and

Δ is the phase difference between the two signals.

$I_a$ and $I_b$ are the corresponding input electromagnetic intensities on waveguides a and b respectively, and are just the above-defined electric fields multiplied by their complex conjugate:

$$I_a = E_a E_a^*$$

$$I_b = E_b E_b^*$$

If we define f as the fraction of one input's intensity that remains on that waveguide at the output of the coupler, then we can write the output electric fields as:

$$E'_a = \sqrt{f}Ae^{i\omega t} + \sqrt{1-f}Be^{i(\omega t + \Delta - \pi/2)}$$

$$E'_b = \sqrt{f}Be^{i(\omega t + \Delta)} + \sqrt{1-f}Ae^{i(\omega t - \pi/2)}$$

The output intensities $I'_a$ and $I'_b$ are then just the output electric fields times their complex conjugates:

$$I'_a = [\sqrt{f}Ae^{i\omega t} + \sqrt{1-f}Be^{i(\omega t + \Delta - \pi/2)}][\sqrt{f}Ae^{-i\omega t} + \sqrt{1-f}Be^{-i(\omega t + \Delta - \pi/2)}]$$

$$I'_b = [\sqrt{f}Be^{i(\omega t + \Delta)} + \sqrt{1-f}Ae^{i(\omega t - \pi/2)}][\sqrt{f}Be^{-i(\omega t + \Delta)} + \sqrt{1-f}Ae^{-i(\omega t - \pi/2)}]$$

These expressions for intensity expand, and simplify to:

$$I'_a = fA^2 + (1-f)B^2 + 2A^2B^2\sqrt{f(1-f)}\cos(\Delta - \pi/2)$$

$$I'_b = fB^2 + (1-f)A^2 + 2A^2B^2\sqrt{f(1-f)}\cos(\Delta + \pi/2)$$

If the spacing between the waveguides, and the length of this interaction region of the coupler are chosen to split equal amounts of each input signal onto each of the two output waveguides, then f=½ and the coupler is referred to as a 50:50 coupler. In this case, the output signal intensities can be described as:

$$I'_a = \tfrac{1}{2}I_a + \tfrac{1}{2}I_b + \sqrt{I_a I_b}\cos(\Delta - \pi/2)$$

$$I'_b = \tfrac{1}{2}I_a + \tfrac{1}{2}I_b + \sqrt{I_a I_b}\cos(\Delta + \pi/2)$$

These output intensities are sinusoidal functions of the input phase difference Δ and they are one hundred eighty degrees out of phase with each other. The one hundred eighty degree phase shift between the output signal intensities is a consequence of the ninety degree phase shift imparted during an evanescent transition between two waveguides.

The coupler behavior is affected by multiple properties (e.g. spacing between waveguides, length, curvature, varying indices of refraction). It is customary to refer to couplers by either the amount of light they couple (e.g. 50:50, 33:33:33, 10:90, etc.), or to reference the interaction length used in theoretical electromagnetic modeling calculations. That length is often the length, $L_{c50}$, needed to couple fifty percent of the light in a 2×2 coupler. In this way, an important aspect of the coupler can be specified independently from the details of how the coupler is designed. In this application, we will use both conventions. When referring to a 2×2 coupler, the XX:YY convention will generally be used, where XX is the "through" power, and YY is the "crossover" power. Therefore, if electromagnetic radiation is delivered to one input of a 10:90 coupler, ten percent will pass through without changing waveguides and ninety percent will be transferred to the adjacent waveguide and sustain a ninety degree phase delay. When referring to 3×3 couplers, a different convention will generally be used, and we will specify coupler lengths (also referred to as interaction lengths) in arbitrary length units in which a coupler length of about seven hundred eighty five such units couples fifty percent of the light across a 2×2 coupler.

The one hundred eighty degree complementary relation between the two output signals results in some serious disadvantages when using a 2×2 coupler for measurement of an input phase difference. The sensitivity of the measurement is close to zero for both output signals at the same input phase difference and these regions of insensitivity repeat every one hundred eighty degrees. In addition, there is no property of the output signals that indicates whether the input phase is changing in a positive or negative sense. We only observe that the outputs are changing sinusoidally. This ambiguity is a serious problem in most phase measurement applications. For example, in a surface topology measurement where the surface height controls the phase of one of the input signals, it is important to know whether the surface is advancing towards, or receding from the detector.

Multi-port couplers can be designed to overcome these disadvantages. Prior systems have used a 3×3 coupler to produce three output signals for a phase measurement device with more uniform sensitivity. These systems can also determine the direction of input phase progress.

A 3×3 coupler can be made by twisting three fibers A, B, and C together and then heating and pulling them such that the three fibers fuse to form a composite optical fiber with a substantially triangular cross section. FIG. 1 shows the device in schematic form where the three-dimensional character of the coupler is represented by the intertwining of the three waveguides A, B and C. FIG. 2 schematically shows the idealized symmetry of the triangular cross section of the three fibers. In this arrangement, any one fiber is in equal contact with both of the other two fibers. As a consequence of this, light injected on fiber A couples to both fibers B and C, and then also mutually couples from B to C and from C to B. This extra mutual coupling produces an additional phase lag for the light in waveguides B and C with respect to the light in waveguide A. As a result, when the coupler interaction length is chosen to produce equal intensities in each of the three output waveguides, the light in waveguides B and C is one hundred twenty degrees out of phase with the light in waveguide A, not just ninety degrees as it was in the 2×2 coupler case. Under actual conditions the phase delay may be somewhat different than one hundred twenty degrees.

When equal intensity inputs are injected into any two waveguides, as suggested schematically in FIG. 3, a unique property of this waveguide arrangement is that it produces a one hundred twenty degree phase relation between the intensities of the three outputs A', B', and C' as a function of the phase difference between the two input signals. This unique output phase relation is plotted as a function of input phase difference in FIG. 4.

The one hundred twenty degree output phase relation eliminates the phase direction ambiguities, and phase sensitivity loss problems that are caused by the one hundred eighty degree phase relation inherent in 2×2 couplers. With three phases, the direction of phase progress is indicated by the cyclic permutation of the phases progressing "forward" as A', B', and C', or "backwards" as A', C', and B'. In addition, it can be seen that whenever one phase is near a maximum or minimum intensity, the other two phases have relatively steep slopes. Because of this, the three output intensities carry information about the input phase in such a way that the device has essentially uniform phase sensitivity throughout the entire domain of input phase differences.

To simplify the assembly, reduce costs, and improve aspects of system integration, it is desirable to integrate components such as these 3×3 couplers into a planar optical waveguide such as that depicted in FIG. 5. Note that the three-fold symmetry is lost and the mutual coupling between waveguides A and C is dramatically reduced. It becomes clear that the planar coupler of FIG. 5 cannot manifest the same properties as the three-dimensional 3×3 fused coupler.

FIG. 6 shows a schematic representation of the planar 3×3 coupler, and indicates signal being introduced into waveguide B. Each single mode waveguide is illustrated here as a single line. The two-dimensional nature of this coupler is suggested by the lack of intertwining of the waveguide lines. The evanescent interaction region is suggested by the curved gathering of the three lines. We will refer to such a planar 3×3 device as a 3×3 subunit from here onwards to facilitate the description of the current invention in later sections.

FIG. 7 is a plot of the computed intensities of output waveguides A', B', and C' as a function of the interaction length of the coupler in an ideal 3×3 planar subunit. Subunits will be referred to as ideal when path length variations, A to C coupling, and other effects are not taken into consideration. Signal couples off of waveguide B equally into waveguides A and C, and at two particular lengths, the intensity in waveguides A and C equal the intensity in waveguide B.

Alternately, if signal is injected into waveguide A (or equivalently C) as suggested in FIG. 8, the ideal 3×3 planar subunit does not produce uniform splitting for any interaction length. FIG. 9 illustrates this point with a plot of the output intensities of the three waveguides as a function of interaction length.

For the reasons described in the preceding two paragraphs, when light is injected into any two inputs of this 3×3 planar subunit, the advantageous uniform peak output intensities and one hundred twenty degree phase relation between the outputs that were found in the three-dimensional 3×3 couplers cannot be achieved using this 3×3 planar subunit.

At least one attempt has been made to make 3×3 multiphase interference devices using a single planar 3×3 subunit. The multiphase operation of this device depended on the additional phase shift produced by the differential propagation speeds of the inner and outer waveguides.

In this work, a 3×3 planar subunit was designed to produce roughly a one hundred twenty (plus or minus ten) degree output intensity phase relation as a function of the input phase difference of two signals injected on waveguides A and C. A serious limitation of this device was the lack of reproducibility of the output phase relation. Several variables must be precisely controlled in order to make the device reproducible and therefore manufacturable. The inter-waveguide coupling strength, total path length, and differential propagation speed must be chosen so that the additional phase shift would result in the correct optimal output phase relation for the same nominal coupler length. Since these properties are complex functions of the subunit construction parameters and all of these parameters are subject to variations in the fabrication process, it would have been difficult to achieve all targets simultaneously. This is evidenced by the large spread in output intensity phase relation reported.

Another limitation that was also a consequence of the lack of the precise one hundred twenty degree phase relation was that the third available output, waveguide B, which was not utilized for this reason, would not have the same maximum and minimum amplitudes as the two outputs on waveguides A and C. Also, the output on waveguides A and C did not span the full intensity range from zero to one hundred percent; at best they achieved about eighty five percent contrast. Because of this, the sinusoidal signals carrying the input phase information was riding on a DC bias level that was subject to drift, changes in the input laser power, and changes in the target object reflectivity.

All of these factors seriously complicate the interpretation of the output intensities into a corresponding precise determination of the input phase difference free from offset drifts, nonlinearities, and changes in the amount of light reflected back into an interferometric device.

Finally, depending on the materials used to make the waveguide, and the practical limitations controlling the dimensions and spacing of the waveguides, it can be difficult to achieve the needed additional phase shift required for a 3×3-like behavior unless the coupler structure is made very long. This extended length not only makes it more difficult to hit desired design parameter tolerance targets during the fabrication of the coupler, but it also makes the finished coupler more susceptible to changes in performance caused by temperature changes and substrate stress after manufacture.

Despite the inability of a 3×3 planar subunit to manifest all the desirable properties of a three-dimensional 3×3 coupler, a somewhat viable form of 3×3 coupler can be made in planar geometries using non-evanescent coupling devices such as a multimode interference device. Even though this device is planar, it achieves mutual cross coupling between waveguides B and C by using reflection and interference effects as described below. This device consists of three single mode waveguides which enter fairly abruptly into a larger waveguide segment that is capable of supporting multiple transverse modes, as depicted in FIG. 10. At the opposite end of this larger segment, three single mode exit waveguides carry three signals away.

The three signals entering the multimode waveguide region propagate and reflect off of the walls of the multimode waveguide region in such a way that interference effects cause the majority of the light to be "focused" back into the three single mode exit waveguides. The width and length of the multimode region is chosen so that the effective phase shift from waveguide A to B' is the same as from A to C', due at least in part to the reflections from the walls. In this way, the same electromagnetic behavior produced in a three-dimensional 3×3 fused fiber coupler, as depicted in FIG. 1, is replicated in a planar waveguide device, as depicted in FIG. 10.

One disadvantage of the multimode planar 3×3 coupler as depicted in FIG. 10 is the opportunity for impedance mismatches to arise if the coupler is not perfectly designed and manufactured. Even then, changes in the wavelength of the light used in the coupler can cause it to respond off of its design target because the interference, on which the device relies to provide perfect coupling without back reflections, is by nature wavelength dependent. For some applications, this disadvantage may be acceptable. For others, it is desirable to ensure near zero back reflections with more independence from wavelength, design, and manufacturing variations.

Unlike multimode interference couplers, evanescent couplers such as the three-dimensional fused fiber coupler depicted in FIGS. 1 and 2 are very adiabatic in their transition from three single mode waveguides to one coupled-mode waveguide (in the tapered fused region) and back out into the three single mode waveguides again. In this way, impedance discontinuities which produce back reflections are essentially eliminated.

The arrangements discussed so far have involved outputs separated in phase by one hundred twenty degrees and ninety degrees. Generally, two outputs with phase separations of any value can be useful for phase measurement as long as their phase separation does not get close to one hundred eighty degrees or zero degrees. It is just desirable to have phase separations of 360/M degrees, where M is an integer, in order to simplify the mathematical calculations of the phase difference. It follows that couplers with five, six, or even more outputs may also prove useful in certain applications.

In some applications, fewer than all of the available outputs of such a multi-port coupler can provide a desirable utility. For example, only two of the four outputs, representing $\sin(\Delta)$ and $\cos(\Delta)$, in a 4×4 quadrature system might be sufficient for many applications. So some of the outputs may be terminated or otherwise not used. Likewise, since in most applications the desire is to determine the phase difference between two input signals, these multi-port couplers may also have one or more inputs which are terminated or otherwise unused. Despite these terminations, the device will have at least three inputs and three outputs where the outputs have an intensity phase relation that is non-complementary (i.e. different from one hundred eighty degrees out of phase). So, we may define n and m as the "externally-connected" number of inputs and outputs while we retain N and M as representing the "internal" number of inputs and outputs.

The problem that remains however is how to produce such desirable multi-port evanescent couplers in a planar geometry where it is topologically impossible to place certain pairs of waveguides together to maximize coupling. What is needed, therefore, is an apparatus that overcomes problems such as those described above, at least in part.

SUMMARY

The above and other needs are also met by multi-port planar evanescent coupler systems having N inputs and M outputs where N>2, and M>2. Such systems are made possible through the technique of combining planar evanescent 2×2 and 3×3 coupler subunits with phase shift elements interspersed along selected waveguides between the coupler subunits. Various system topologies are possible depending on the values of N and M and the desired phase relation between the outputs.

As an example of this technique, two identical 3×3 evanescent coupler subunits can be connected in series with a fixed phase delay inserted in the middle waveguide between the two coupler units to produce an ideal one hundred twenty degree 3×3 planar evanescent coupler. Equivalently, but perhaps more conveniently, the phase delay sections can be placed in each of the outer waveguides to produce the same 3×3 evanescent coupler performance.

As a further example of this technique, an ideal one hundred twenty degree 3×3 planar evanescent coupler can also be produced by connecting six 2×2 evanescent coupler subunits with four phase shift elements in a topology to be described in detail later. In this case, there are four input and output waveguides, with one each input and output being terminated so that N=M=4 and n=m=3.

As a further example of this technique, five 2×2 evanescent coupler subunits, four of which are identical, can be combined with two identical phase shift units (in a topology to be described in detail later) to produce a 4×4 coupler with four outputs exhibiting a ninety degree output intensity phase relation.

As a further example of this technique, two identical 3×3 evanescent coupler subunits can be connected in series with one phase delay inserted in the middle waveguide, or phase delays in the two outer waveguides, between the two coupler units to produce an phase measurement system with three intensity outputs, two of which are ninety degrees out of phase with each other (and the third being one hundred thirty five degrees out of phase with the two quadrature outputs). While the topology of this device is the same as that for the 3×3 ideal coupler described above, the coupler lengths and phase shifts are different.

Thus it is clear that a variety of useful multi-port coupler devices and systems can be implemented with various combinations of planar evanescent 2×2 and 3×3 coupler subunits of suitably chosen lengths, interspersed with phase shift elements of suitably chosen phase shifts. Such devices and systems have the advantages of the adiabatic transitions of evanescent couplers and the advantages of the planar waveguide geometries for efficient system integration.

The above multi-port planar evanescent coupler systems are generally very symmetric with symmetries between forward and backward propagation paths, and between first to last waveguide ordering across the multiple ports. According to another aspect of the invention, there is described an advantageous configuration variation which intentionally breaks some of these symmetries. In particular, certain coupler lengths which would be the same in symmetric configurations can be made to be different lengths. When this is done, and an appropriate change in certain phase shift elements is made, the new "compensated" coupler system maintains a more ideal behavior over a much larger range of variations of coupler fabrication tolerances, and over a wider range of operating wavelengths.

According to another aspect of the invention, there is described a phase measurement employing a multi-port planar evanescent coupler. Such a system contains a radiation source such as a laser, an optional means of coupling that radiation to the multi-port planar evanescent coupler, such as a coupler or circulator, so that signals from the multi-port coupler may return to a detector while radiation from the source forward couples to the multi-port planar evanescent coupler, an optional means of controlling the polarization, or discarding light of an unwanted polarization as it exits and/or re-enters the multi-port planar evanescent coupler, and at least two detectors coupled to at least two outputs of the multi-port planar evanescent coupler. Components of this system other than the multi-port planar evanescent coupler may be remotely connected to, or integrated onto the same planar waveguide structure as the multi-port planar evanescent coupler. The working and reference signals from this device may be optically connected to mirrors and further waveguides, which may be able to modulate the amplitude and phase of the light propagating through them.

One specific embodiment is a three input, three output, planar evanescent optical coupler with three input waveguides designated as A, B, and C, and waveguide B disposed between waveguides A and C. A first evanescent interaction region couples waveguide B to waveguides A and C, and a second evanescent interaction region couples waveguide B to waveguides A and C. A phase shifting region is disposed between the first and second evanescent interaction regions, where a phase shift is selectively introducible into at least one of waveguides A, B, and C. Three output waveguides are provided, designated as A', B', and C'.

With a phase shift region between the two evanescent interaction regions, in the manner as described, a selectable coupling can be instantiated between the three inputs, such that the inputs can be blended as desired between one another.

In various embodiments according to this aspect of the invention, the phase shift is selectively introduced in waveguide B only, or the phase shift is introduced in both waveguides A and C only. In one embodiment the phase shift of about sixty degrees is inserted in waveguide B. Alternately, the phase shift of about sixty degrees is inserted in both waveguides A and C. The three input, three output, planar evanescent optical waveguide can be used in a phase measurement system, such as a three detector system or a two detector system.

In another specific embodiment of the invention there is described a phase measurement system, with a three input, three output, planar evanescent optical waveguide having three input waveguides designated as A, B, and C, where waveguide B is disposed between waveguides A and C, a first evanescent interaction region where waveguide B couples to waveguides A and C, a phase shifting region where a phase shift is selectively introducible into at least one of waveguides A, B, and C, a second evanescent interaction region where waveguide B couples to waveguides A and C, and three output waveguides designated as A', B', and C', a first detector optically connected to A, a light input source optically connected to B, a second detector optically connected to C, a working mirror optically connected to A', a light dump optically connected to B', and a reference mirror optically connected to C'.

In yet another specific embodiment of the invention there is described a phase measurement system with a three input, three output, planar evanescent optical waveguide having three input waveguides designated as A, B, and C, where waveguide B is disposed between waveguides A and C, a first evanescent interaction region where waveguide B couples to waveguides A and C, a phase shifting region where a phase shift is selectively introducible into at least one of waveguides A, B, and C, a second evanescent interaction region where waveguide B couples to waveguides A and C, and three output waveguides designated as A', B', and C', a two input, two output, planar evanescent optical waveguide having two input waveguides designated as D and E, a third evanescent interaction region where waveguide D couples to waveguide E, two output waveguides designated as D' and E', a light input source optically connected to D, a first detector optically connected to E, a light dump optically connected to D', E' optically connected to A, a second detector optically connected to B, a third detector optically connected to C, a working mirror optically connected to A', a light dump optically connected to B', and a reference mirror optically connected to C.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 17 is a three input, three output, planar evanescent optical coupler according to a preferred embodiment of the present invention with input on both outer conductors and balanced output.

FIG. 18 is an output graph of a three input, three output, planar evanescent optical coupler according to a preferred embodiment of the present invention with input on both outer conductors.

FIG. 19 is a three input, three output, planar evanescent optical coupler with balanced output according to a second embodiment of the present invention.

FIG. 20 is a chart of some possible phase shifts that give useful non-uniform coupling ratios in a three input, three output, planar evanescent optical coupler according to a preferred embodiment of the present invention.

FIG. 43 is a plot of output intensity of a 3×3 coupler for inputs on two adjacent inputs, according to a preferred embodiment of the invention.

FIG. 44 is a plot of output intensity of a 3×3 coupler for inputs on two distal inputs, according to a preferred embodiment of the invention.

FIG. 45 is a table of splitting ratios produced by varying degrees of offset in a 3×3 coupler formed of 2×2 couplers, according to a preferred embodiment of the invention.

DETAILED DESCRIPTION

According to the preferred embodiments of the present invention, three-dimensional-like behavior can be produced in multi-port planar evanescent couplers by combining 3×3 and 2×2 planar evanescent coupler subunits with appropriately chosen phase shifts along the waveguides between the planar subunits.

Figure 1:
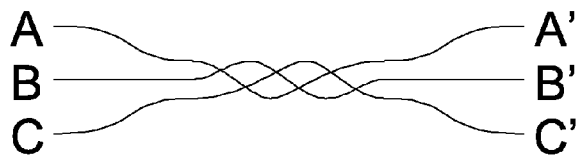
FIG. 1 is a schematic representation of a prior art three input, three output, three-dimensional optical coupler, depicting the three intertwining waveguides A, B, and C.
Figure 11:
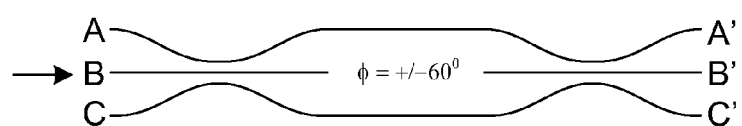
FIG. 11 is a three input, three output, planar evanescent optical coupler according to a preferred embodiment of the present invention with input on a middle conductor and balanced output.

FIG. 11 is an example of a 3×3 planar evanescent coupler possessing the same desirable characteristics as the three-dimensional 3×3 fused fiber coupler of FIG. 1. This new planar evanescent coupler consists of two substantially identical 3×3 planar evanescent subunits connected in series with about a sixty degree phase shift, either lead or lag, in the center waveguide, B.

Figure 12:
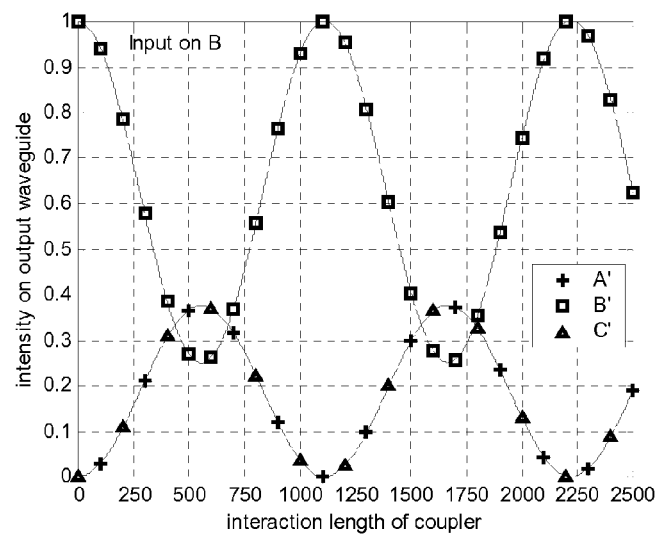
FIG. 12 is an output graph of a three input, three output, planar evanescent optical coupler according to a preferred embodiment of the present invention with input on a middle conductor.

FIG. 12 illustrates the coupling of intensity to waveguides A and C when signal is injected on waveguide B. As in the case of the simple planar 3×3 subunit, intensity couples evenly from waveguide B onto waveguides A and C. In the present case we have two lengths of subunit of about four hundred thirty five and six hundred seventy six units at which we can produce even splitting between all three waveguides. The same splitting also occurs at lengths of about fifteen hundred forty four and seventeen hundred eighty eight units, and repeats periodically thereafter about every twenty two hundred twenty one additional units. Typically, the shortest coupler length is the most desirable for practical reasons, so we will not be concerned with higher order solutions for now.

Regarding conventions, it should be noted that all phase shifts discussed can be applied to a waveform moving it forward or backward and generally only the magnitude will be stated.

Figure 2:
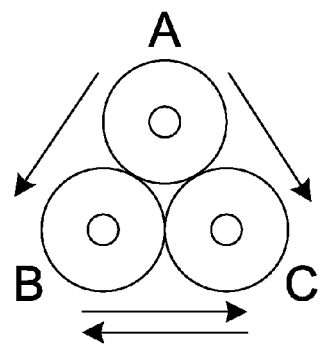
FIG. 2 is a cross-sectional representation of the prior art three input, three output, three-dimensional optical coupler.
Figure 3:
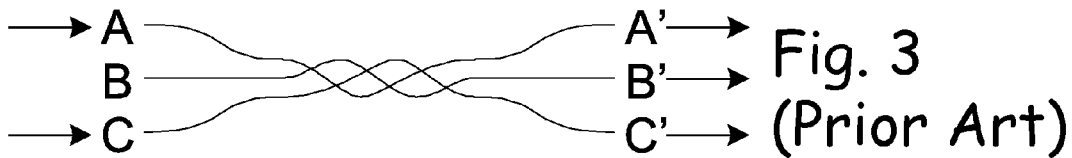
FIG. 3 is a schematic representation of the prior art three input, three output, three-dimensional optical coupler, depicting equal input intensity on two of the intertwining waveguides.
Figure 4:
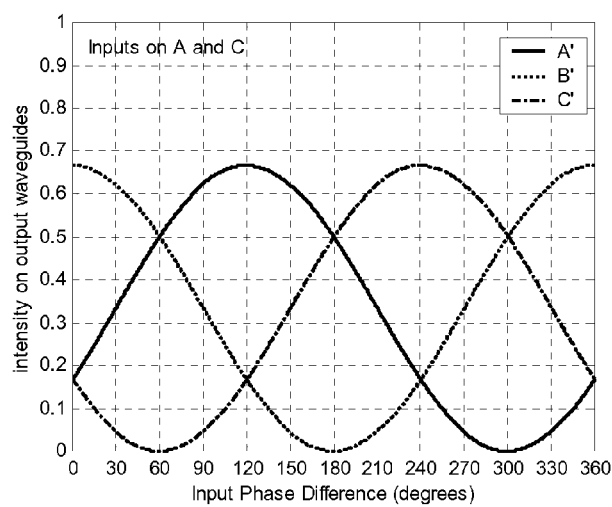
FIG. 4 is an output graph of the prior art three input, three output, three-dimensional optical coupler with input as depicted in FIG. 3.
Figure 5:
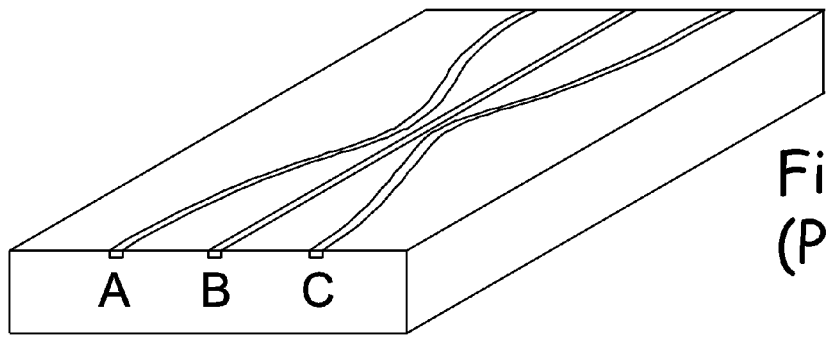
FIG. 5 is a perspective depiction of a prior art three input, three output, planar evanescent optical coupler.
Figure 6:
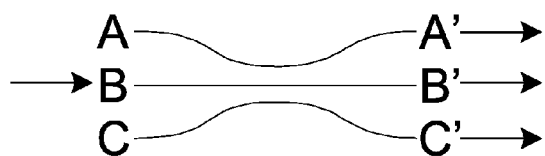
FIG. 6 is a prior art three input, three output, planar evanescent optical coupler with input on a middle conductor and unbalanced output.
Figure 7:
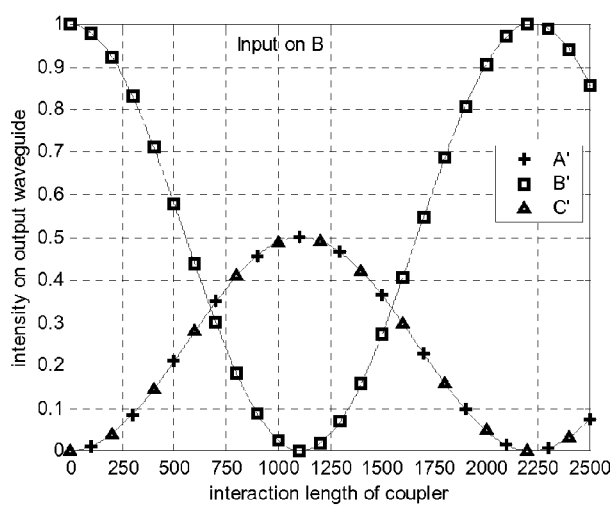
FIG. 7 is an output graph of a prior art three input, three output, planar evanescent optical coupler with input on a middle conductor.
Figure 8:
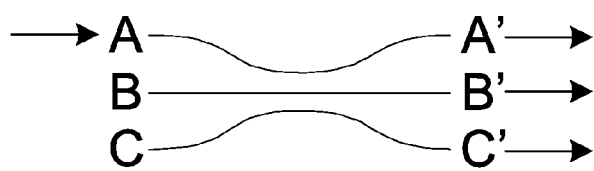
FIG. 8 is a prior art three input, three output, planar evanescent optical coupler with input on an outer conductor and unbalanced output.
Figure 9:
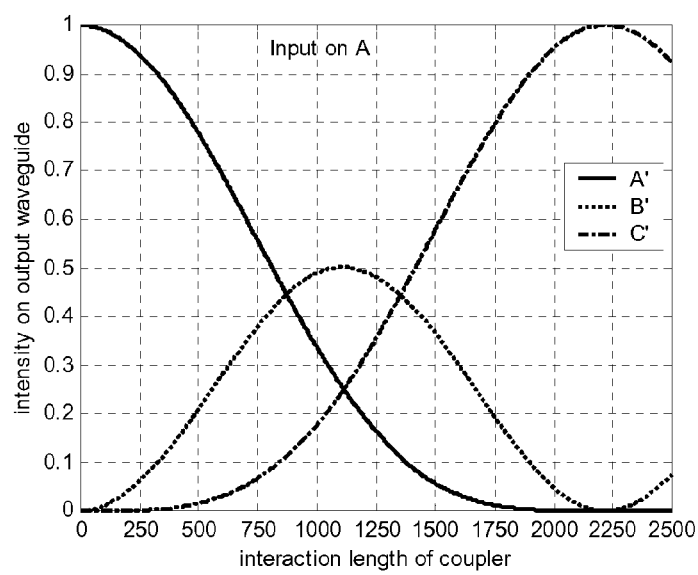
FIG. 9 is an output graph of a prior art three input, three output, planar evanescent optical coupler with input on an outer conductor.
Figure 10:
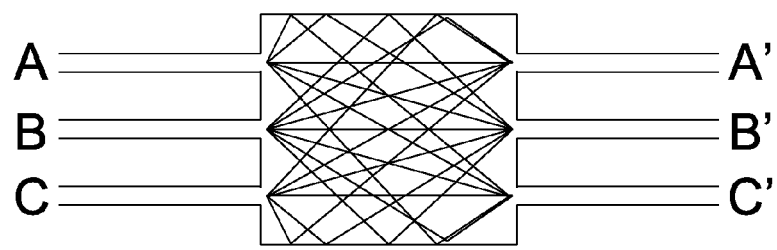
FIG. 10 is a prior art three input, three output, planar optical coupler.
Figure 13:
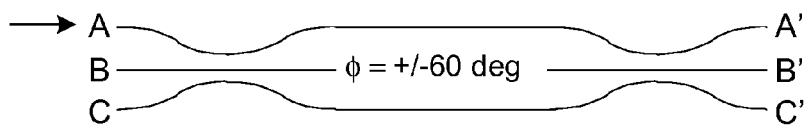
FIG. 13 is a three input, three output, planar evanescent optical coupler according to a preferred embodiment of the present invention with input on an outer conductor and balanced output.
Figure 14:
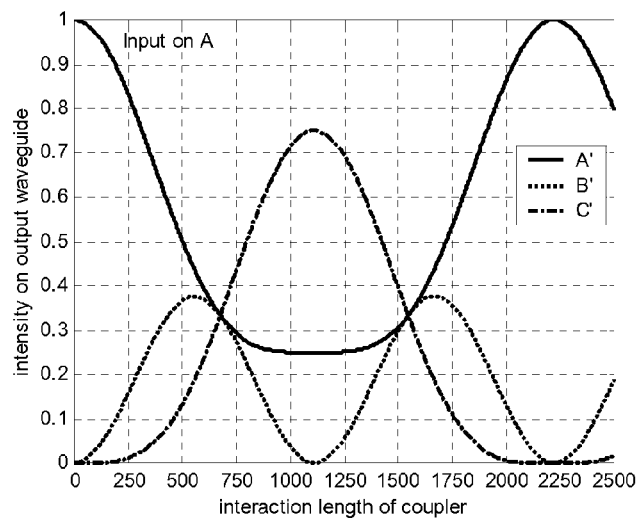
FIG. 14 is an output graph of a three input, three output, planar evanescent optical coupler according to a preferred embodiment of the present invention with input on an outer conductor.

FIG. 13 schematically illustrates the same planar coupler with light being injected on waveguide A (or equivalently C). FIG. 14 illustrates that at a subunit length of about six hundred seventy six units, the new planar evanescent coupler achieves even power splitting from waveguide A to both waveguides B and C even though waveguide C is not adjacent to waveguide A. This is the same length that produced even splitting when signal is injected into waveguide B. This coupler therefore produces even power splitting at this length regardless of which waveguide is used as an input. This is the same behavior of a three-dimensional fused fiber coupler as depicted in FIGS. 1 and 2, but it is now produced in a planarized form using evanescent coupling techniques.

Figure 15:
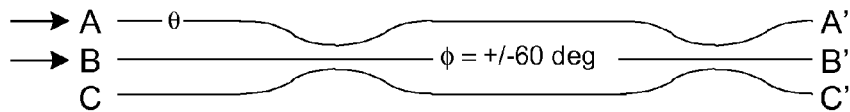
FIG. 15 is a three input, three output, planar evanescent optical coupler according to a preferred embodiment of the present invention with input on a middle conductor and an outer conductor and balanced output.
Figure 16:
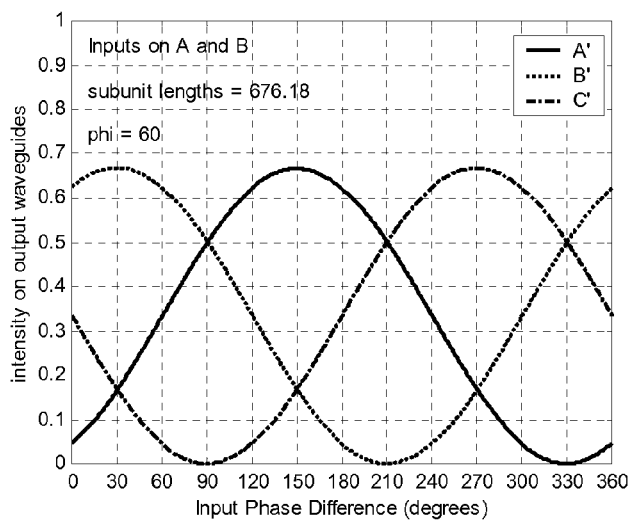
FIG. 16 is an output graph of a three input, three output, planar evanescent optical coupler according to a preferred embodiment of the present invention with input on a middle and an outer conductor.

Furthermore, if this new planar coupler is used for phase measurement, the same one hundred twenty degree intensity phase relation among the three outputs is produced as with conventional fused fiber couplers. For light injected into waveguides A and B, as depicted in FIG. 15, and progressively phase shifted by an angle $\theta$, the output intensities, depicted in FIG. 16, follow the desired one hundred twenty degree phase relation as a function of $\theta$ as in three-dimensional fused fiber couplers. The same input output relation is also true if light is injected into ports A and C as suggested in FIG. 17, and plotted in FIG. 18. In both cases, the intensity amplitudes of all three outputs are equal in magnitude and span the full range from zero to one hundred percent.

In practical terms, the phase shift in waveguide B could be made by making that path length between the two coupler subunits longer or shorter than waveguides A and C. Alternatively, the width of the waveguide can be made wider or narrower so as to alter the phase velocity of the propagating mode rather than its physical path length.

Since the sign of the phase shift is of little consequence, the phase shift may alternately be inserted into the two outer waveguides A and C of the coupler, as depicted in FIG. 19. The A and C legs could be made wider or narrower than the B leg so as to produce a phase lag or lead by again altering the phase velocity rather than the path length. However, since the waveguides A and C usually bend away from waveguide B as they exit the interaction regions of the first 3×3 subunit, the A and C waveguides are naturally longer than the B waveguide. So controlling this natural path length difference may be the preferred method of setting the desired phase shift.

With the phase shifts in waveguides A and C, the same interference behavior illustrated above in FIGS. 16 and 18 is still produced. Only the relative permutation of the phases in waveguides A, B, and C are affected by the choice of phase shift sign.

While the sixty degree phase shift between the 3×3 subunits produces a coupler that gives uniform output power splitting and a one hundred twenty degree phase relation between the output intensities when the coupler is used in phase measurement applications, there are a variety of possible phase shifts that give useful non-uniform coupling ratios from the 3×3 coupler according to the present invention. Some of these phase shifts and coupling ratios are depicted in the chart of FIG. 20. One of the advantages of this coupler design is that these various coupler properties can be achieved by manipulating one easily controlled parameter of the coupler structure.

For example, at a phase shift of about 37 degrees, lead or lag, a 40:20:40 coupler is formed in which twenty percent of the light remains on the waveguide in which the light was injected, and forty percent couples to each of the neighboring waveguides. A property of the couplers made using this arrangement of subunits and phase shifts is that the splitting ratio doesn't depend on the physical waveguide used as an input. The splitting ratio is determined relative to which waveguide is used as the input, not relative to a particular physical waveguide A, B, or C.

Figure 21:
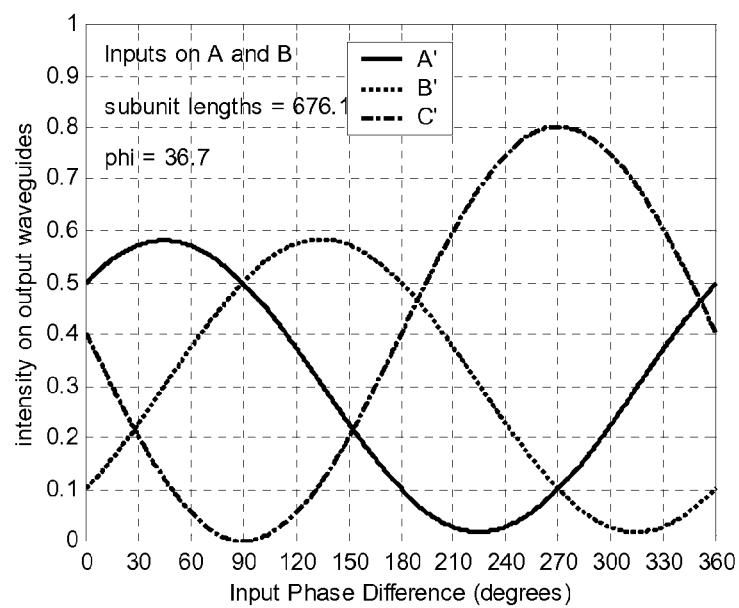
FIG. 21 is a chart of the 40:20:40 output from a version of a three input, three output, planar evanescent optical coupler according to a preferred embodiment of the present invention that has the unique property that, if used as a phase measurement device by injecting light into two waveguides A and B (or A and C) the light coming out of waveguides A' and B' (or A' and C') progresses with intensities that are ninety degrees out of phase with each other, as the input phase shift between the light in waveguides A and C is changed.

As an example of the utility of some of these special ratios, the 40:20:40 version of this coupler has the unique property that, if used as a phase measurement device by injecting light into two waveguides A and B (or A and C) the light coming out of waveguides A' and B' (or A' and C') progresses with intensities that are ninety degrees out of phase with each other as the input phase shift between the light in waveguides A and C is changed. Such a quadrature phase relationship can be used, for example, in position encoding or decoding systems to unambiguously represent the phase difference within the three hundred sixty degree phase shift input domain. The third output, carrying the balance of the input signal powers, is one hundred thirty five degrees out of phase with the first two outputs. A plot of this special relationship is shown in FIG. 21. This is similar to the utility of the 3×3-one hundred twenty degree coupler, but in this case the phase relation is ninety degrees instead of one hundred twenty degrees, and only two output signals are used instead of three.

So far the focus has been on a topology that uses two 3×3 planar subunits and one or two phase shifts between the subunits. This topology has been shown to produce a variety of waveguide-independent splitting ratios, and two particularly useful phase measurement configurations. The disclosed invention is not limited to the use of 3×3 planar subunits or to the one topology so far disclosed to form such useful devices.

Figure 22:
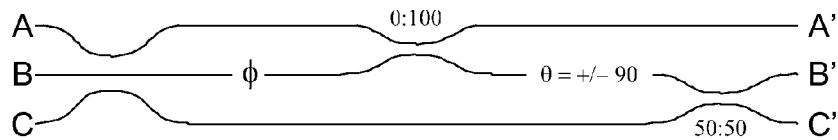
FIG. 22 is a three input, three output, planar evanescent optical coupler using one 3×3 planar subunit and two 2×2 planar subunits, so as to produce ideal three-dimensional 3×3 coupler behavior.

As a further example of the disclosed invention, a configuration is disclosed in which one 3×3 subunit is combined with two 2×2 planar subunits and phase shifts so as to produce an ideal three-dimensional 3×3 coupler behavior. The configuration is shown schematically in FIG. 22. This 3×3 coupler consists of one 3×3 subunit of length of about six hundred seventy six units, followed by an arbitrary phase shift phi on waveguide B, then two individual 2×2 couplers, the first being a 0:100 coupler along waveguides A and B, and the second being a 50:50 coupler along waveguides B and C. A phase shift, theta, of about plus or minus ninety degrees is inserted in waveguide B between the 2×2 couplers.

Figure 23:
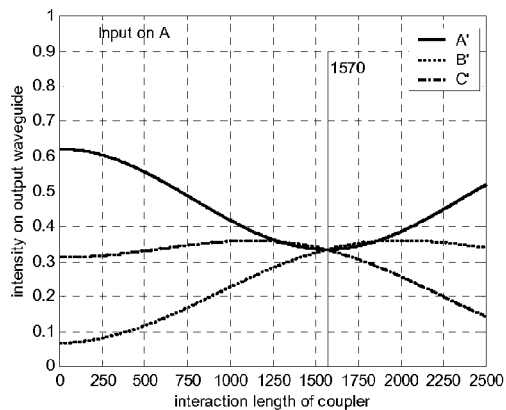
FIG. 23 is a chart of the output from the coupler of FIG. 22, with input on channel A.
Figure 24:
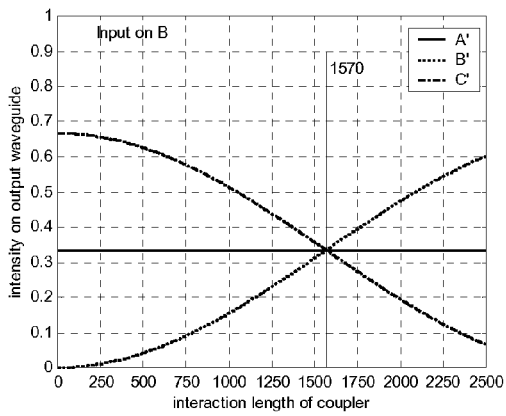
FIG. 24 is a chart of the output from the coupler of FIG. 22, with input on channel B.
Figure 25:
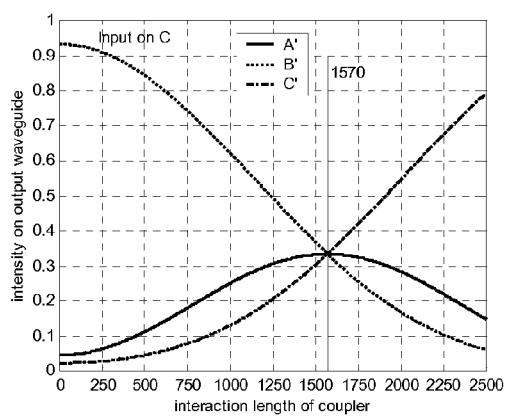
FIG. 25 is a chart of the output from the coupler of FIG. 22, with input on channel C.

FIGS. 23-25 illustrate the power splitting nature of this particular 3×3 planar evanescent coupler for signals injected on waveguides A, B, and C respectively as a function of the length of the first 2×2 coupler. In each case, the signal is split equally onto the three exit waveguides when the coupler is about fifteen hundred seventy units long. This corresponds to a 0:100 coupler, or one in which all of the signal is transferred to the opposite waveguide, and none is left on the input waveguide.

Although not illustrated, the value of phase shift phi is arbitrary. It has no direct effect on the splitting ratio or coupler length required to produce equal power splitting. It does however affect the slopes of the various curves as they pass through the equal splitting point. Because of this, the phase phi is an important parameter in determining how quickly the splitting ratios deviate from the desired splitting as a function of this 0:100 coupler length. FIGS. 23-25 are for values of phi equal to ninety degrees.

Figure 26:
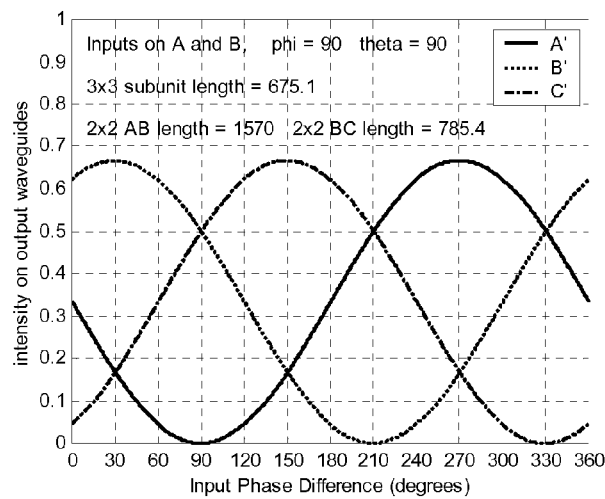
FIG. 26 is a chart of the output from the couple of FIG. 22, with input on channels A and B.
Figure 27:
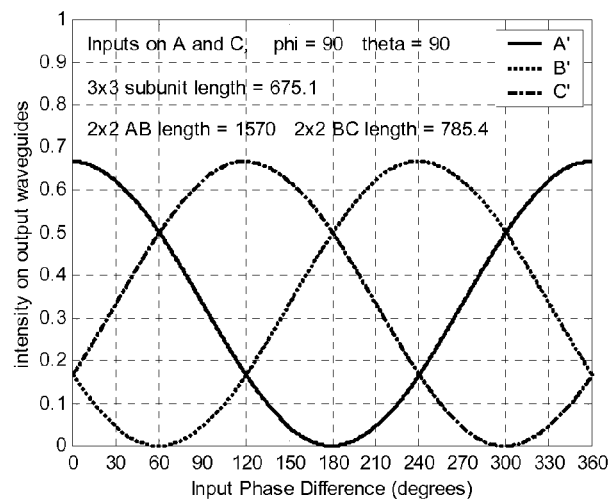
FIG. 27 is a chart of the output from the couple of FIG. 22, with input on channels A and C.
Figure 28:
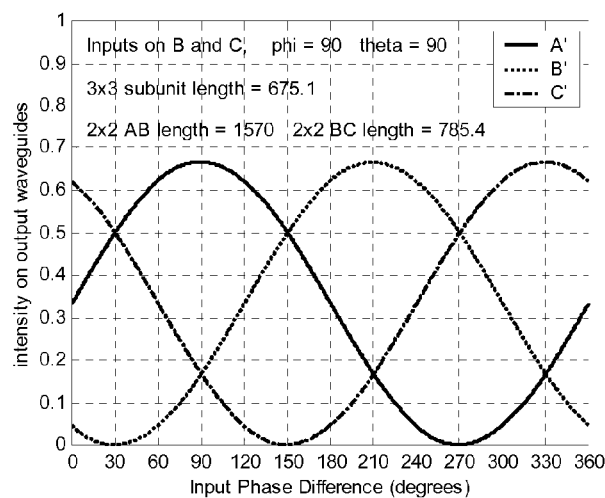
FIG. 28 is a chart of the output from the couple of FIG. 22, with input on channels B and C.

FIGS. 26-28 illustrate the interference performance of the 3×3 coupler when signal is inject into waveguides A and B, A and C, and B and C respectively. In each case, it is clear that the three output intensities follow the same ideal one hundred twenty degree phase relation that was produced by the 3×3 coupler fabricated out of two 3×3 subunits.

As a further example of the disclosed invention, a configuration is disclosed in which only 2×2 planar subunits and phase shifts are used to produce an ideal three-dimensional 3×3 coupler behavior. The configuration is shown schematically in FIG. 29. This 3×3 coupler consists of four individual 2×2 subunits and a phase shift with two of the couplers being about 43:58 splitting ratio, and the remaining two couplers being about 16:84 splitting ratio. The phase shift required in this case is about one hundred five degrees, either lead or lag.

Figure 30:
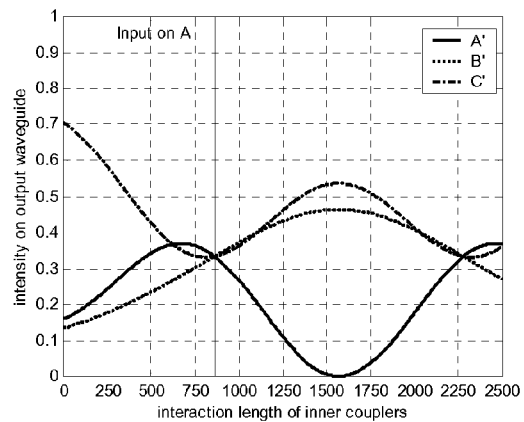
FIG. 30 is a chart of the output from the coupler of FIG. 29, with input on channel A.
Figure 31:
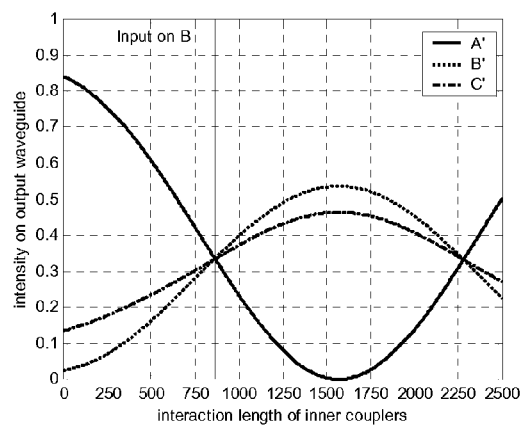
FIG. 31 is a chart of the output from the coupler of FIG. 29, with input on channel B.
Figure 32:
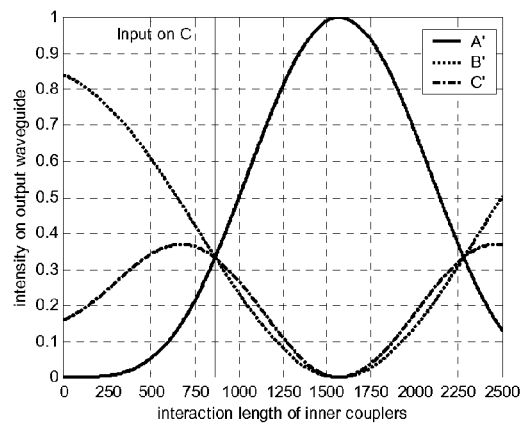
FIG. 32 is a chart of the output from the coupler of FIG. 29, with input on channel C.

This coupler produces even splitting of the input power from any input waveguide to the three output waveguides. The output splitting intensity as a function of the interaction length of the inner (nominally 42:58) couplers is shown in FIGS. 30-32 for signal input on waveguides A, B, and C respectively. It can be seen that at the indicated length of the nominally 42:58 couplers, the input intensity is uniformly split to each of the three outputs regardless of which input waveguide the signal is injected into. This is the same output produced by a three-dimensional fused fiber coupler.

Figure 33:
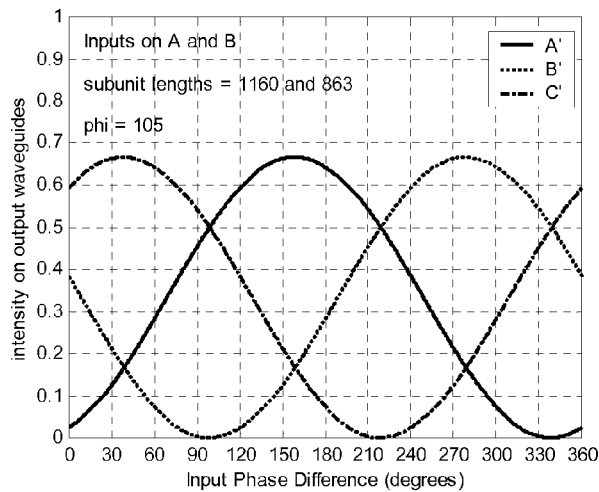
FIG. 33 is a chart of the output from the coupler of FIG. 29, with input on channels A and B.
Figure 34:
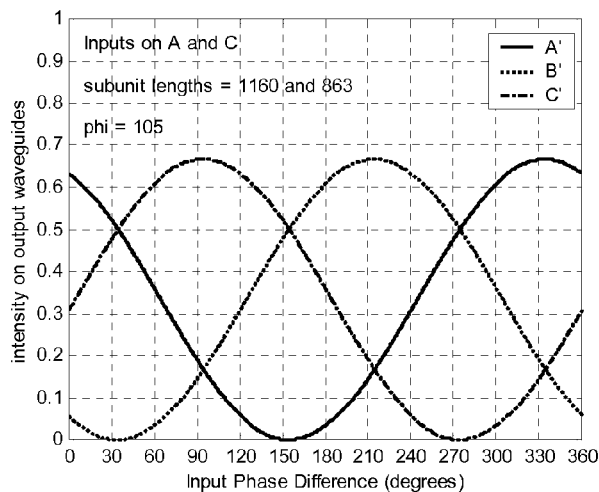
FIG. 34 is a chart of the output from the coupler of FIG. 29, with input on channels A and C.
Figure 35:
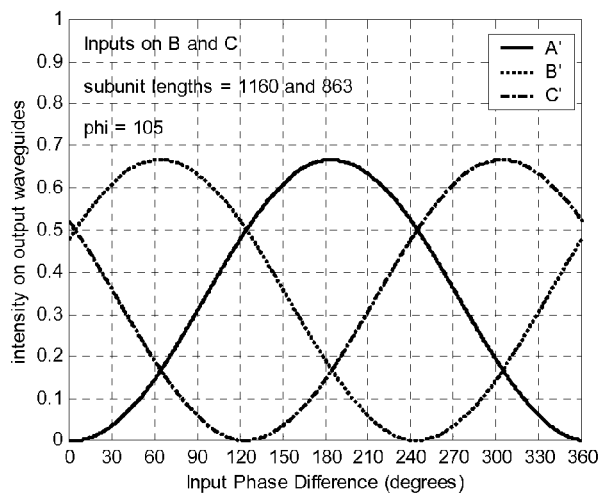
FIG. 35 is a chart of the output from the coupler of FIG. 29, with input on channels B and C.

This same coupler can be used as a phase measurement device when light is injected into any two inputs. Again, as before, the output intensities follow a one hundred twenty degree phase relation as a function of the input phase difference between the two input signals. Also, as before, the output intensities are all equal in amplitude, and span the full range of zero to one hundred percent of the available output range. This relation is shown in FIGS. 33-35 for light injected into waveguides A and B, and A and C, and B and C respectively.

Figure 29:
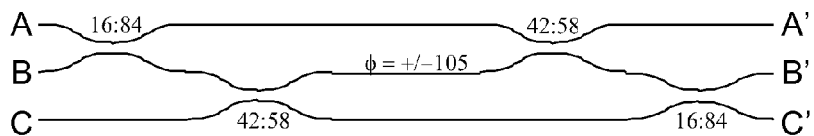
FIG. 29 is a three input, three output, planar evanescent optical coupler using four 2×2 planar subunits, so as to produce ideal three-dimensional 3×3 coupler behavior.
Figure 36:
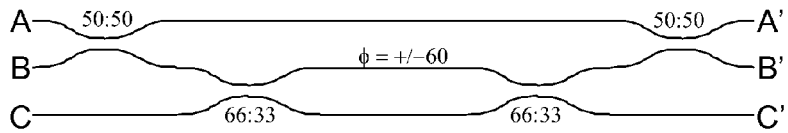
FIG. 36 is a three input, three output, planar evanescent optical coupler using four 2×2 planar subunits, so as to produce ideal three-dimensional 3×3 coupler behavior.
Figure 37:
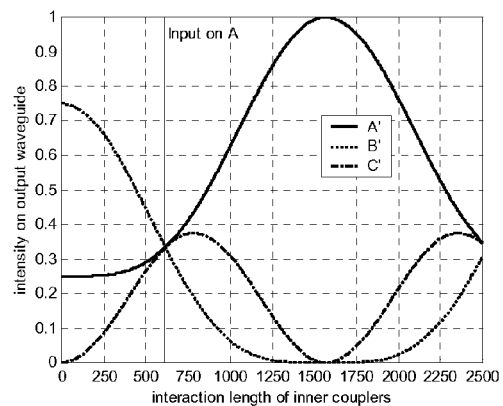
FIG. 37 is a chart of the output from the coupler of FIG. 36, with input on channel A.
Figure 38:
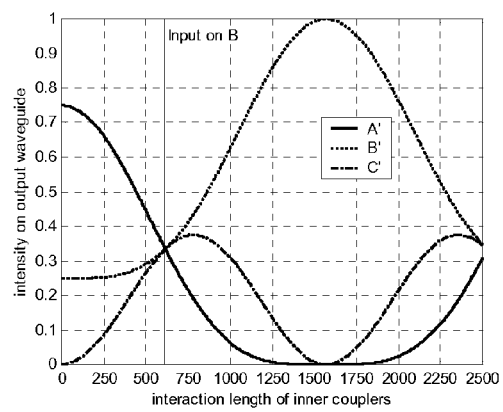
FIG. 38 is a chart of the output from the coupler of FIG. 36, with input on channel B.
Figure 39:
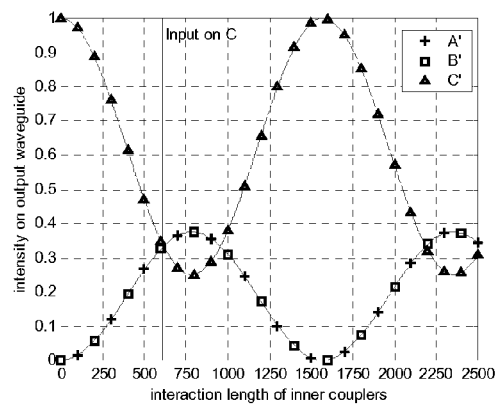
FIG. 39 is a chart of the output from the coupler of FIG. 36, with input on channel

Another planar evanescent 3×3 coupler closely related to the topology shown in FIG. 29 is shown in FIG. 36 and also uses four 2×2 subunits and a single phase shift. In this case, the two outer couplers are 50:50 splitting ratio, and the two inner couplers are 66:33 splitting ratio. The phase shift in this case is about sixty degrees, either lead or lag. As in the previous case, this coupler produces uniform power splitting from any input to each of the three outputs. This is illustrated in FIGS. 37-39. When used as an phase measurement device, it also produces three equal amplitude outputs that progress with a one hundred twenty degree phase relation as a function of the input phase difference.

Figure 40:
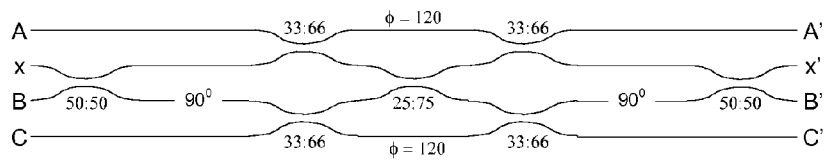
FIG. 40 is a schematic of a planar 3×3 coupler implemented with only 2×2 couplers and phase shifts, according to a preferred embodiment of the invention.

Another planar evanescent 3×3 coupler can be made out of seven 2×2 planar evanescent subunits and four phase shift elements. This topology is shown in FIG. 40. The coupler consists of a symmetric "core" of five 2×2 subunits and two phase shifts. The four corner subunits are all the same 33:66 splitting ratio, and the center 2×2 subunit is a 25:75 splitting ratio device. The phase shifts in the outside waveguides of this core provide about one hundred twenty degrees of phase lag.

Alternately, the center coupler can be a 25:75 device of the next longer length that produces such a coupling ratio, two thousand ninety five units, as long as the phase shift is changed accordingly to make up for the extra coupler length, in this case being changed to sixty degrees of phase lag. Generally, equivalent coupler splitting ratios for any periodic length that produces the desired splitting can be used as long as the phase shifts are adjusted to account for such changes. We will not itemize here all such possibilities.

This core portion of the coupler has four input and output ports. Since this is a 3×3 coupler (port x not used as either an input or an output), the two central ports are combined in a symmetric way so as to reduce the input and output to three ports each. The 50:50 coupler and associated ninety degree phase lag form a splitting unit that splits inputs from port B into two identical signals with no relative phase shift. Signal that entered port B and crossed over in the 50:50 coupler incurred a ninety degree phase lag in the crossover process. Therefore the ninety degree phase lag explicitly balances this crossover phase lag, and the two signals are substantially identical. This same function could have been performed by a Y-branch waveguide splitter, but this kind of device would be more likely to produce back-reflections, and violate the design goal of using only evanescent devices.

Figure 41:
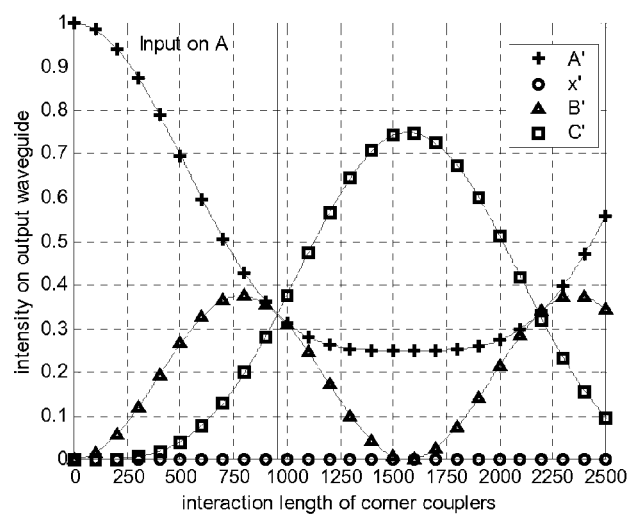
FIG. 41 is a plot of output intensities as a function of coupler length for light injected on a first waveguide, according to a preferred embodiment of the invention.
Figure 42:
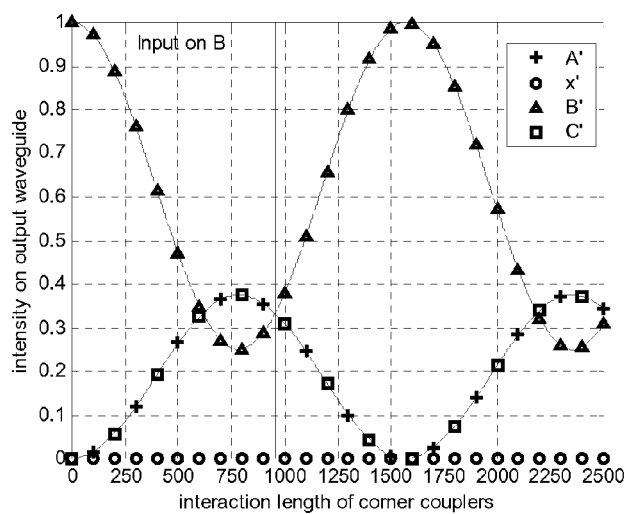
FIG. 42 is a plot of output intensities as a function of coupler length for light injected on a second waveguide, according to a preferred embodiment of the invention.

Together, the core structure and the symmetric splitters combine to produce a very symmetric coupler structure that, as before, produces uniform power splitting from any input waveguide A, B, or C to each of the three output waveguides A', B', and C'. FIGS. 41 and 42 illustrate this splitting for light injected on ports A (or equivalently C) and B respectively.

In addition, when used as a phase measurement device, this coupler also produces three equal amplitude output signals that progress with a one hundred twenty degree phase relation as a function of the input phase difference between the two input signals. This is illustrated in FIGS. 43 and 44 for light injected into ports A and B, and A and C respectively.

Other 3×3 coupler splitting ratios are also possible with this topology as they were in the device constructed of two 3×3 subunits shown in FIG. 19. By changing the coupling ratio of the center coupler, and changing the two associated phase shifts in the "core" portion of the coupler, various splitting ratios from essentially 0:100:0 up to about 44.5:11:44.5 can be produced. FIG. 45 lists a number of possible splitting ratios and the coupler strengths and phase shifts needed to produce the indicated splitting ratios. The relation between the specified center coupler splitting ratio and the resulting 3×3 coupler splitting ratio in this table can be computed conveniently for any splitting ratio via the relation:

$$Center\_cross\_ratio = (1/44.45)*Split$$

where
Center_cross_ratio=the center coupler transmitted intensity (in percent), and
Split=the split percentage intensity from the 3×3 coupler outputs.

As a further example of the disclosed invention, a configuration is disclosed in which true 4×4 behavior is produced using five 2×2 planar subunits and two phase shifts. This coupler can be used in a phase measurement configuration to produce four output intensities with equal amplitudes and ninety degree phase relations between the four output signals as a function of the phase difference between the two input signals.

Figure 46:
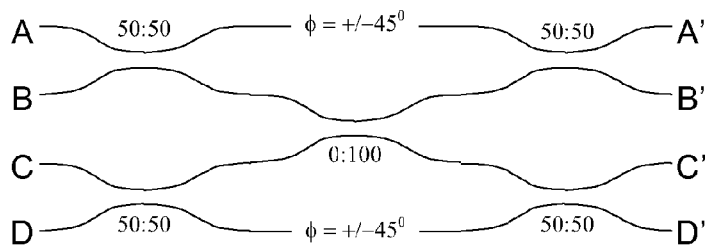
FIG. 46 is a schematic of a 4×4 coupler, according to a preferred embodiment of the invention.

The topology producing the 4×4 behavior is shown in FIG. 46. The coupler consists of four 2×2 "corner" 50:50 subunits, and one 0:100 "crossover" subunit connecting the four corner subunits. Two forty five degree phase shifts (lead or lag) are located in the outer waveguide connections between the input and output corner subunits.

Figure 47:
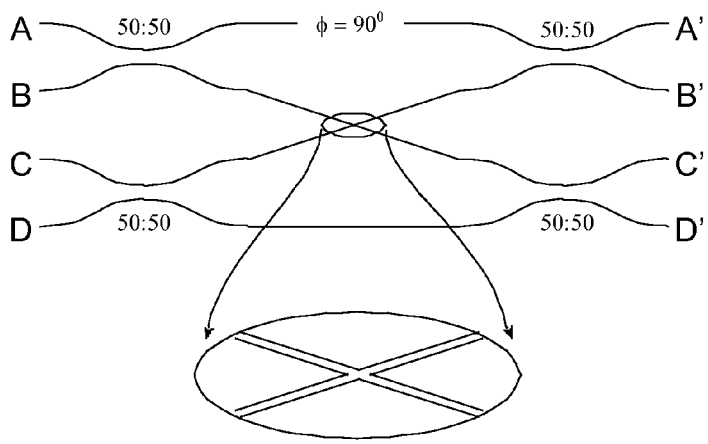
FIG. 47 is a schematic of a prior art 4×4 planar coupler.

The topology shown in FIG. 46 is a new extension of topologies previously disclosed (and shown schematically in FIG. 47). The coupler of FIG. 46 has the major advantage over the prior art and other such topologies in that it is entirely planar, whereas the prior devices were made from fused fibers that require a physical three-dimensional arrangement of the fibers to affect the topological crossover of the two inner signals.

The topology of FIG. 46 is different from that shown in FIG. 47 in at least one important way. The present topology uses only evanescent couplers to achieve all the signal mixing and topological re-arrangements required. The topology shown in FIG. 47 uses a waveguide "x-crossing" to cross the inner two signals. In this "x-crossing," two straight waveguides intersect at an angle such that very little light couples onto the angled exit waveguide while the majority of the light passes straight across the junction. The important disadvantage of this type of structure is that it produces back-reflections from the scattering at the sharp corners of the junctions. Such back-reflections are serious impediments to achieving good performance in phase measurement devices. The topology of FIG. 46 avoids such problems by using a 0:100 evanescent coupler to effect the signal crossover. By affecting the signal crossover with such an evanescent structure, back-reflections are held to essentially negligible levels.

Figure 48:
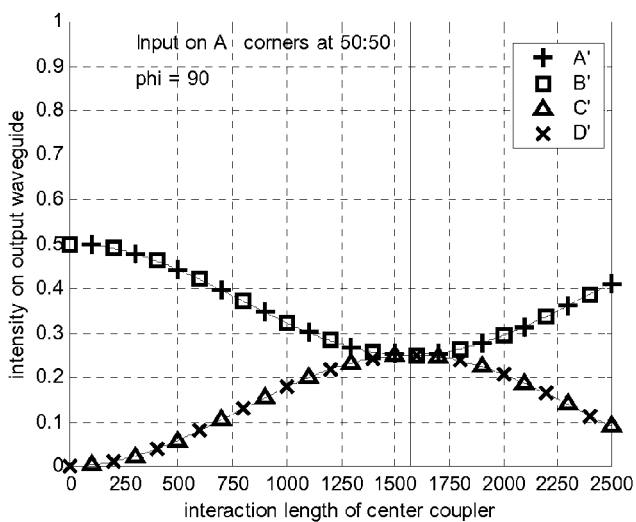
FIG. 48 is a plot of coupling ratios for a 4×4 coupler with input on an outside input, with a ninety degree phase shift, according to a preferred embodiment of the invention.
Figure 49:
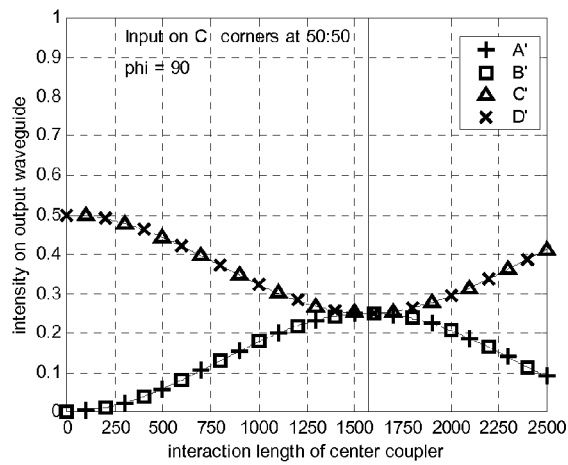
FIG. 49 is a plot of coupling ratios for a 4×4 coupler with input on an inside input, with a ninety degree phase shift, according to a preferred embodiment of the invention.

FIGS. 48 and 49 illustrate the uniform power splitting property of the 4×4 planar evanescent coupler as a function of the center coupler length for phase angles, phi, of ninety degrees. In FIG. 48, one signal is injected into port A (or equivalently D), and in FIG. 49 one signal is injected on port C (or equivalently B). In each case, uniform splitting of the input signal is achieved. It is also evident from these plots that such uniform splitting is achieved over a fairly wide range of coupler lengths. As such, this choice of phase angles is advantageous when uniform power splitting of one signal is desired.

Figure 50:
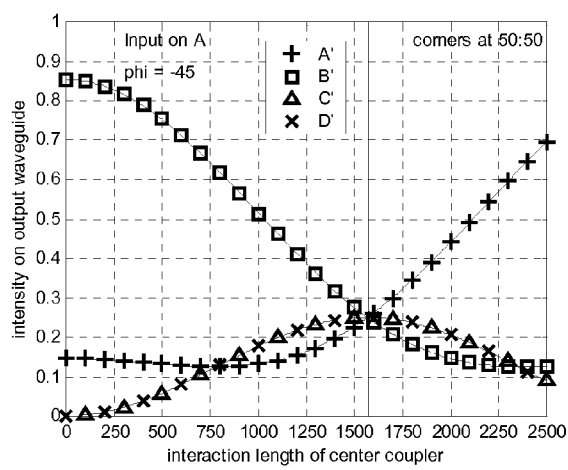
FIG. 50 is a plot of coupling ratios for a 4×4 coupler with input on an outside input, with a forty-five degree phase shift, according to a preferred embodiment of the invention.
Figure 51:
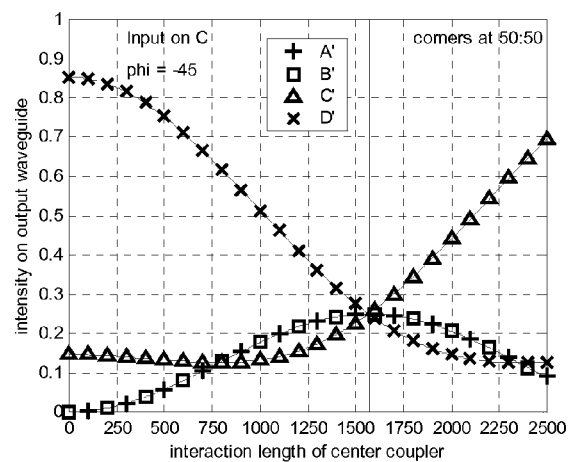
FIG. 51 is a plot of coupling ratios for a 4×4 coupler with input on an inside input, with a forty five degree phase shift, according to a preferred embodiment of the invention.

Likewise FIGS. 50 and 51 illustrate a similar uniform power splitting when the phase angles are chosen to be forty five degrees. In these plots, it can be seen that only near a particular length of center coupler is the power splitting uniform. The advantage of the forty five degree phase angle lies not in applications requiring uniform power splitting from one input signal, but in phase measurement applications where uniform amplitude intensity outputs with ninety degree phase relations are desired.

While uniform 25:25:25:25 power splitting from any one input to the four outputs of the planar evanescent coupler shown in FIG. 46 can be achieved with any pair of phase shift values, true 4×4 quadrature outputs are only produced when the phase shifts are forty five degrees. More generally, quadrature outputs can still be obtained if the phase shifts on the top and bottom waveguides are skewed in a non-symmetric way as long as the shifts sum to ninety degrees (either lead or lag). For example, a combination such as thirty and sixty degrees produces the same quadrature outputs as the combination of forty five and forty five degrees.

Figure 52:
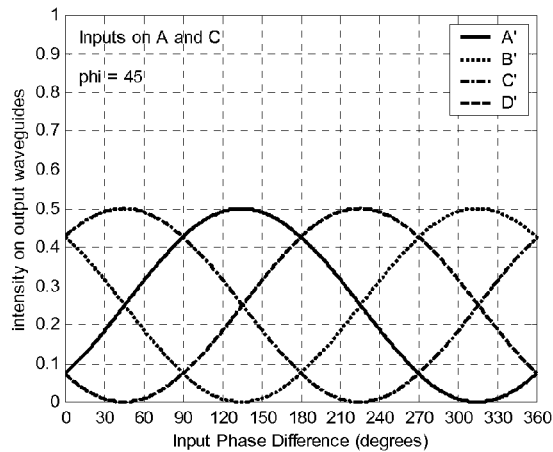
FIG. 52 is a plot of output intensities for a 4×4 coupler with input on an outside input and a non adjacent inside input, with a forty five degree phase shift, according to a preferred embodiment of the invention.
Figure 53:
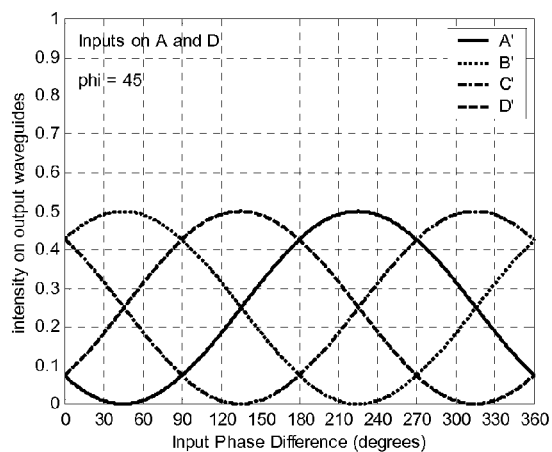
FIG. 53 is a plot of output intensities for a 4×4 coupler with input on an outside input and a non adjacent inside input, with a forty five degree phase shift, according to a preferred embodiment of the invention.
Figure 54:
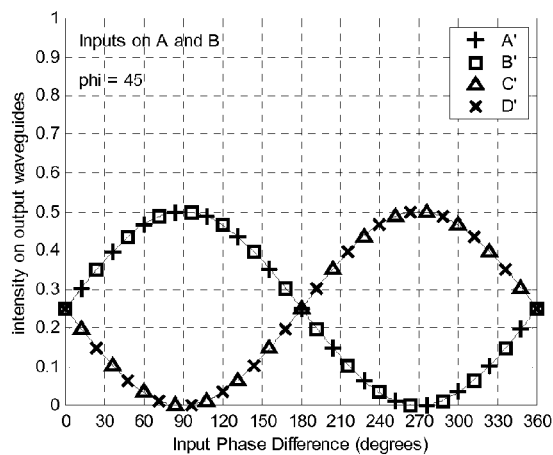
FIG. 54 is a plot of output intensities for a 4×4 coupler with input on an outside input and an adjacent inside input, with a forty five degree phase shift.

In FIGS. 52 and 53, the phase angle, phi, is set to forty five degrees. These figures illustrate the ninety degree phase relation between the four output signal intensities as a function of input phase difference when two signals are injected into various port combinations. When light is injected into ports A and C (FIG. 52), or A and D (FIG. 53), the output signals progress with a uniform amplitude and a ninety degree phase relation between the four signals. However, if light is injected into ports A and B (FIG. 54), a redundant pair of complementary (one hundred eighty degree) outputs is produced.

Figure 55:
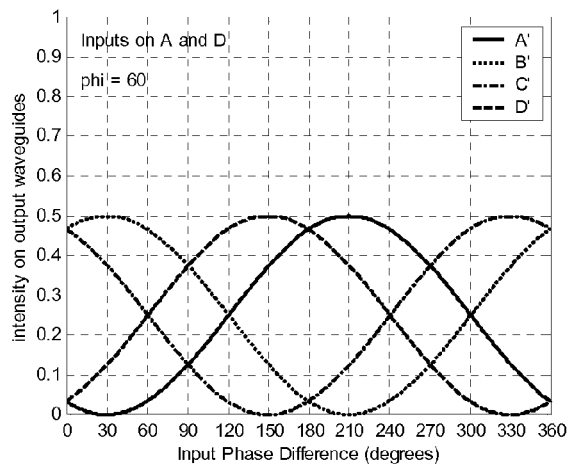
FIG. 55 is a plot of output intensities for a 4×4 coupler with input on an outside input and a non adjacent inside input, with a sixty degree phase shift, according to a preferred embodiment of the invention.
Figure 56:
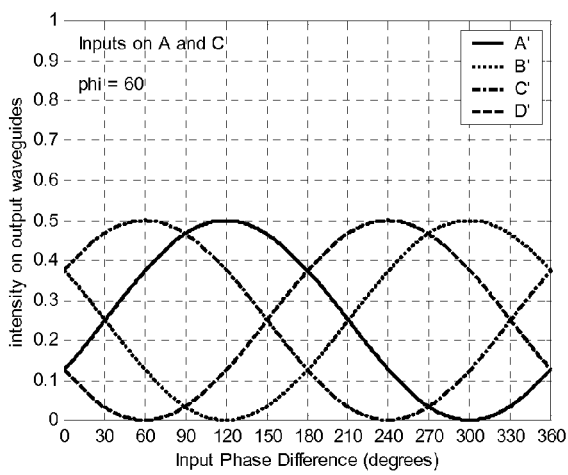
FIG. 56 is a plot of output intensities for a 4×4 coupler with input on an outside input and a non adjacent inside input, with a sixty degree phase shift, according to a preferred embodiment of the invention.
Figure 57:
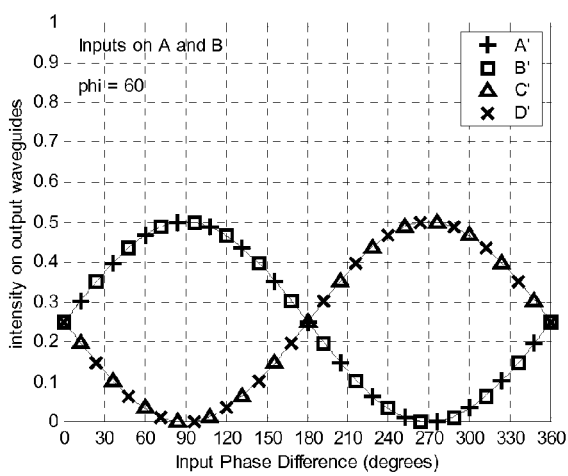
FIG. 57 is a plot of output intensities for a 4×4 coupler with input on an outside input and an adjacent inside input, with a sixty degree phase shift.

If the phase angle, phi, is set to sixty degrees, the output intensities as a function of input phase difference no longer progress ninety degrees out of phase with each other. This is illustrated in FIGS. 55-57. When light is injected into ports A and C (FIG. 55), or A and D (FIG. 56), the output signals progress with a uniform amplitude, but are now sixty and one hundred twenty degrees out of phase with neighboring signals. However, as before, if light is injected into ports A and B (FIG. 57), a redundant pair of complementary (one hundred eighty degree) outputs is produced.

There is next described a design improvement that results in improved performance tolerance of the planar evanescent 3×3 coupler network against deviations of the subunit coupling strengths from their nominal target values.

Changes in subunit coupling strengths tend to occur inevitably as a result of natural variations in fabrication process variables. For example, the thickness, widths, spacings and indices of refraction of the planar waveguide layers may vary from one wafer lot to the next, one wafer to the next, or even change as a function of position on a single wafer. All of these variables affect the strength, and equivalently, the effective length when modeling the interaction region. Because of this, we may model the effect of changes in many fabrication parameters as changes in the coupler subunit length.

Figure 58:
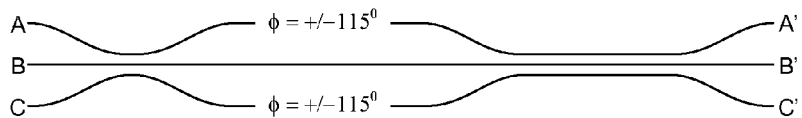
FIG. 58 is a schematic of a 3×3 planar, evanescent coupler where the lengths of the coupler subunits are altered to produce a coupler that maintains its performance characteristics over a wide range of subunit coupler lengths.

It is desirable to design a coupler device which produces stable intensity power splitting and a known output phase relationship despite variations in the fabrication process. In the design described in this section, the lengths of coupler subunits are altered in such a way as to produce a coupler that maintains its performance characteristics over a wide range of subunit coupler lengths. The coupler can be made tolerant to any performance metric. Though this technique is being described for the embodiment involving two basic subunits, it can be applied to designs with more than two subunits. In the case of the 3×3 coupler using two 3×3 subunits and phase shifts, the two equal length planar subunits are adjusted to be of non-equal lengths. FIG. 58 schematically illustrates this new coupler.

To illustrate the usefulness of the technique, we seek to optimize the design to achieve a more tolerant phase relation of the three outputs. The most common manufacturing induced variations will result in the effective interaction lengths of both subunits deviating from design values in the same direction. The planar evanescent 3×3 coupler tolerance would be improved by choosing the effective interaction lengths so that if both 3×3 subunits are lengthened (or shortened) together, the effects from each subunit on the phase relation are in opposite directions and will offset one another. The dual 3×3 subunit design is a simpler case than other designs discussed and one characteristic of this coupler is that the power splitting ratios and the output phase relation are affected similarly. In more complex systems, it may not be possible to simultaneously make both output characteristics tolerant of manufacturing induced variations using one or two design parameters. However, in those more complex systems, there will be more design parameters available for optimization.

Recalling FIG. 14, there are two lengths of coupler subunit that produce ideal 3×3 splitting. At the shorter length of about six hundred seventy six units, the intensity on waveguide C is rising rapidly as a function of increasing coupler length. At the other possible length of fifteen hundred forty four units, the intensity on waveguide C is falling rapidly as a function of increasing coupler length. For each of the other waveguides, the same reversal of coupling slope also exists at the two different lengths. This suggests that a coupler made from one short subunit and one long subunit may exhibit the operational tolerance to deviations of effective interaction length in the same direction from nominal.

Using couplers of differing lengths does prove to be a viable method of reducing the intensity and phase deviations of the coupler as a function of the subunit lengths. However, the optimal lengths for the subunits are not six hundred seventy six and fifteen hundred forty four as just suggested for the purpose of conceptual illustration. While these lengths do produce a coupler that is more tolerant to changes than the basic coupler consisting of equal length subunits, even better tolerance is achieved if we take into account the fact that the length perturbations caused by fabrication tolerance variations are generally proportional to the nominal length of the subunit. If one subunit is twice as long as the other, then its length perturbations will accumulate twice as fast as the shorter subunit. Because of this, the longer subunit, overcompensates the shorter one, and optimal compensation is not achieved. By adjusting the subunit lengths and phase shifts appropriately, we can optimize the performance of the coupler.

For the case of the 3×3 made from two 3×3 subunits, new length values of about five hundred thirty three and thirteen hundred seventy five units are found to produce a coupler with a good balance of output intensity uniformity and low phase error as functions of coupler length. Accordingly, the phase shifts on the middle or two outer waveguides are adjusted to about one hundred fifteen degrees as needed to maintain the desired 3×3 functionality of the coupler and phase measurement device.

For the basic coupler with equal length subunits (six hundred seventy six units each) and sixty degree phase shifts, the intensity of each of the three outputs as a function of input differential phase shift is substantially identical. Also, the three outputs shared a one hundred twenty degree phase relations with each other output. This was illustrated in FIG. 16 and FIG. 18.

Figure 59:
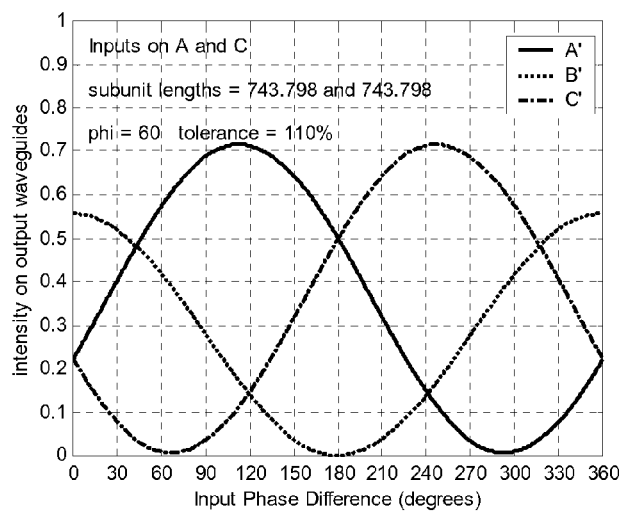
FIG. 59 is a chart of the output of the coupler of FIG. 17 when input is provided on channels A and C and the two coupler subunits are ten percent longer than the nominal target values.

If the subunit coupler lengths in this original configuration are altered by ten percent, we find that the output intensity and phase balance is significantly altered. FIG. 59 shows the output intensities as a function of input phase difference between inputs A and C when the two coupler subunits are ten percent longer than the nominal target values. In this case, the output intensities peak at values of 0.715 and 0.557 instead of 0.667. This is an error of +7.3% and −16.4% from ideal. Also the phase relation has deviated to +/−113 degrees instead of +/−120. So we have an output phase error of about seven degrees. If the coupler subunit lengths are ten percent short of nominal, then we find a phase error of 6.3 degrees and an amplitude imbalance of +10% and −6.2% on the various output signals.

Figure 60:
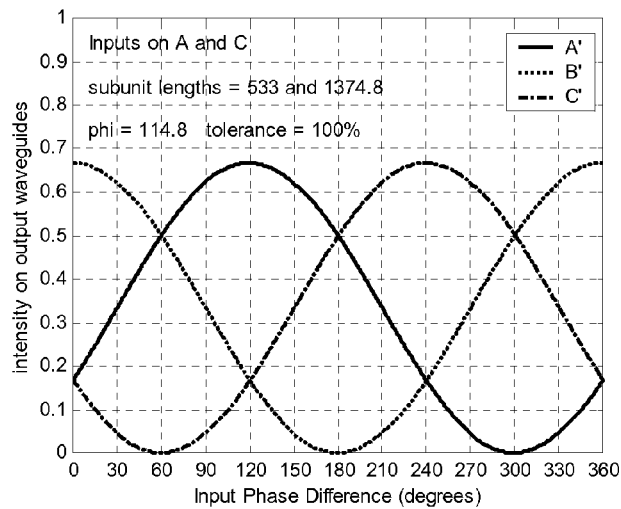
FIG. 60 is a chart of the output of the coupler of FIG. 17 when input is provided on channels A and C, exhibiting ideal behavior.

For the new "compensated" coupler with non-equal length subunits of 533 and 1375 units, and 115 degree phase shifts, the nominal intensities of each of the three outputs as a function of input differential phase shift are again substantially identical. Also, the three outputs nominally share one hundred twenty degree phase relations with each of the other outputs. This ideal behavior is illustrated in FIG. 60.

Figure 61:
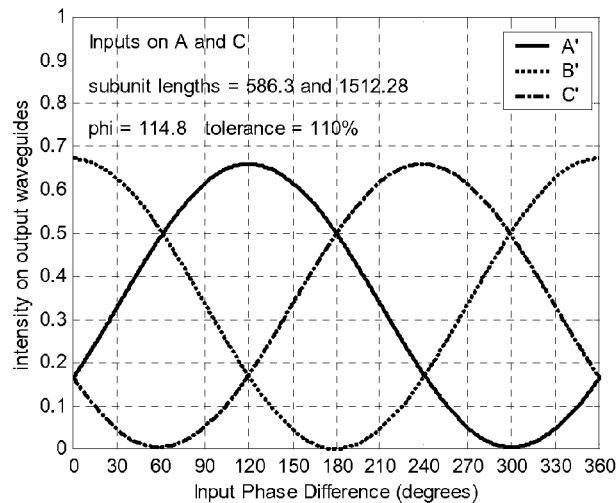
FIG. 61 is a chart of the output of the coupler of FIG. 58 when input is provided on Channels A and C and the two coupler subunits are ten percent longer than the nominal target values.

If the subunit coupler lengths in this new compensated configuration are lengthened by ten percent, we find that the output intensity and phase balance is altered by a much smaller amount. FIG. 61 shows the output intensities as a function of input phase difference between inputs A and C when the two coupler subunits are ten percent longer than the nominal target values. To the eye, FIG. 61 is essentially identical to FIG. 60. In the case of FIG. 61, the output intensities peak at values of 0.672 and 0.660 instead of 0.6667. This is an error of only +1.03% and −0.8% from ideal. Also, the phase error has been reduced to only 0.8 degrees.

If the coupler subunit lengths are shortened by ten percent of their nominal length, then we find a phase error of 1.0 degrees and an amplitude imbalance of +0.86% and −1.26% on the various output signals.

This new coupler has therefore improved the output amplitude balance tolerance against length changes by a factor of between nine to sixteen times the original tolerance values. Likewise, the phase error tolerance against length changes has been improved by a factor of between seven and eight times from 6.3-7.0 degrees to only 0.8-1.0 degrees for a coupler subunit length error of up to ten percent. This is a considerable improvement in the tolerance of important performance characteristics against deviations in the coupler strength as caused by variations in nominal fabrication parameters.

A coupler can be optimized to have improved power splitting tolerance, output phase relation tolerance or improvements in combinations of these characteristics. Accordingly, there are a wide range of possible useful solutions based on the principle of using non-equal length subunits and the appropriate phase shift between them.

The principle of altering the coupler subunit lengths may be applied to other multi-port couplers. Many of the coupler topologies described so far have symmetric arrangements of 2×2 and 3×3 couplers. Some of these multi-port couplers can be made more robust to manufacturing parameter variations by altering the subunit coupling lengths away from the highly symmetric configurations towards asymmetric, self-compensating combinations of different length subunits. The details of these various combinations will not be enumerated here. We simply point out that the same principle of producing tolerant, compensated couplers through the use of different length combinations can be used on coupler systems other than the dual-3×3 subunit coupler.

According to another aspect of the present invention, planar evanescent multi-port waveguide couplers can be used advantageously in systems designed to mix or interfere two signals and produce multiple outputs which carry information about the phase difference between the two input signals. The advantages of the planar evanescent couplers disclosed here are at least two-fold. First, they are designed specifically to be integrated onto a planar waveguide device which may also carry other components of the electromagnetic phase measurement system, and thereby ease system assembly and cost and simultaneously increase system reliability and decrease system size. Second, the evanescent nature of these multi-port couplers ensures that back-reflections from the coupler are virtually eliminated. This enables very low noise performance, and therefore very high phase sensitivity.

Figure 62:
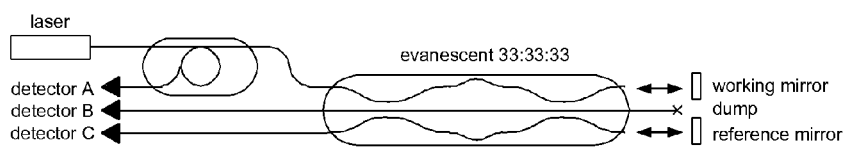
FIG. 62 is a schematic of a phase measurement system using two identical 3×3 planar evanescent multi-port couplers and the appropriate phase shifts.

FIG. 62 schematically illustrates one of many possible phase measurement systems employing planar evanescent multi-port couplers. This example uses a simple 3×3 coupler consisting of two identical 3×3 planar subunits and the appropriate phase shifts. A laser provides light to the coupler through a circulator. The 3×3 coupler splits this light into three right-propagating beams. One of these beams is not used and is dumped, or in some way terminated. The other two beams become the working and reference beams of the phase measurement system. These beams may interact with whatever physical system is used to modulate the phase and or amplitude of the beams before the beams return into the coupler to be compared. In FIG. 62, we show simply two mirrors reflecting the working and reference beams back into the coupler. However, the mirrors could be replaced by a fiber strain gauge, fiber Sagnac loop, or any other optical configuration that modulates the phase and intensity of either of the two beams. The two left-propagating beams are then mixed or interfered within the 3×3 coupler and three intensity output signals exit the coupler. One of these outputs passes through the circulator, and all three outputs arrive at detectors which convert the intensity into electrical signals that can be recorded and processed to compute the phase and amplitude of the working beam with respect to the reference beam.

Figure 63:
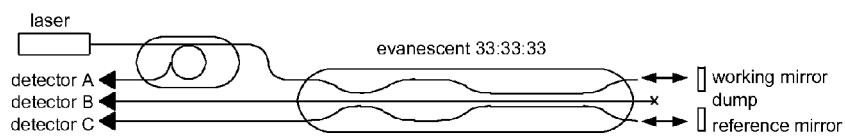
FIG. 63 is a schematic of a phase measurement system using the improved tolerance 3×3 planar coupler that is made of two non-equal length planar subunits and the appropriate phase shifts.

FIG. 63 shows the same system using the improved tolerance 3×3 planar coupler which is made of two non-equal length planar subunits and the appropriate phase shifts. The operation of the system is very similar to that of FIG. 62, however it can function over a broader range of wavelengths and is more tolerant of manufacturing process variations than the simple coupler used in FIG. 62.

Figure 64:
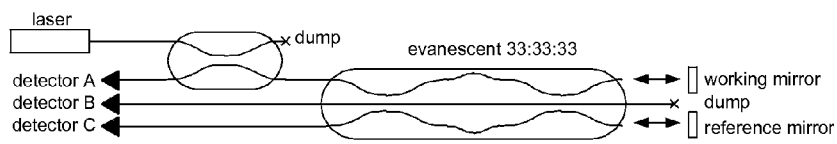
FIG. 64 is a schematic of a phase measurement system using two 3×3 planar evanescent multi-port couplers and phase shifts, in which the circulator has been replaced by a 2×2 coupler.

Since circulators generally rely on birefringent crystals and are relatively expensive, they are difficult to integrate into planar waveguide devices. It is therefore desirable to produce a viable system that avoids such components. FIG. 64 schematically shows another phase measurement system employing a planar 3×3 coupler. In this system, the circulator is simply replaced by a 2×2 coupler. A disadvantage of this approach is that a certain amount of input light is immediately dumped from the optical system and "wasted."

Likewise, a certain amount of return signal is also split off and wasted. However, the advantage of this approach is that the 2×2 coupler can easily be integrated directly into the same planar substrate as the 3×3 coupler and therefore simplifies the overall system, makes it smaller, more reliable, more stable, and less costly. FIG. 64 schematically shows the simple 3×3 planar coupler, but as mentioned above, the improved 3×3 coupler using non-equal length planar subunits can also be used.

Figure 65:
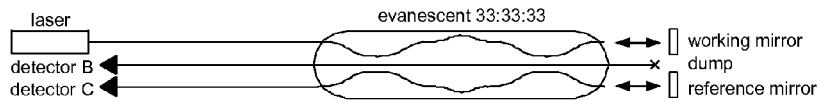
FIG. 65 is a schematic of a 3×3 planar evanescent system in which only two of the 120 degree outputs are used.

In some cases the input coupler or circulator can simply be eliminated. FIG. 65 illustrates a 3×3 system in which only two of the one hundred twenty degree outputs are used. In this case the input laser light is fed directly into the 3×3 coupler and only two of the left-propagating return signal beams are collected for processing. Such a system cannot deduce as much information about the phase and intensity of the working beam with respect to the reference beam, but in some applications, the information present in two beams is sufficient. As before, both the simple equal-length and the improved non-equal length versions of the 3×3 coupler can be used in this configuration.

Figure 66:
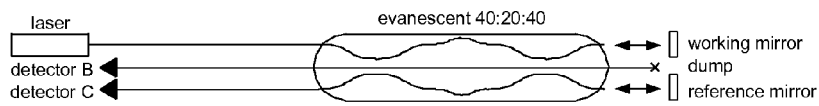
FIG. 66 is a schematic of a ninety degree system based on a 40:20:40 3×3 planar evanescent coupler.

In a similar spirit, other versions of the multi-port coupler can also be used without an input coupler or circulator. FIG. 66 illustrates a ninety degree output system based on a 40:20:40 3×3 coupler. Again, only two of the output signals are collected for processing.

Figure 67:
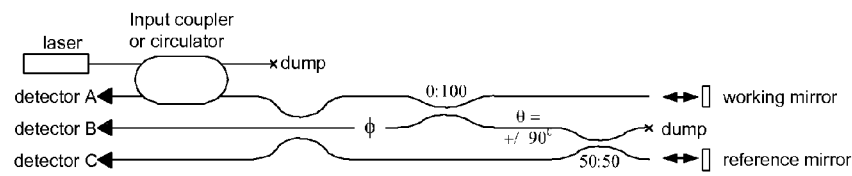
FIG. 67 is a schematic of a 3×3 system based on a 3×3 one hundred twenty degree planar evanescent coupler based on a 3×3 subunit coupler and two 2×2 subunit couplers.

Similar systems employing the disclosed variants of planar evanescent multi-port couplers can also be made and used with similar performance advantages. FIG. 67 illustrates a 3×3 system based on a 3×3 one hundred twenty degree coupler composed of a 3×3 subunit and two 2×2 couplers and the appropriate phase shifts as discussed previously. Such a system can use a circulator or an input coupler so that all three output beams can be collected for processing.

Figure 68:
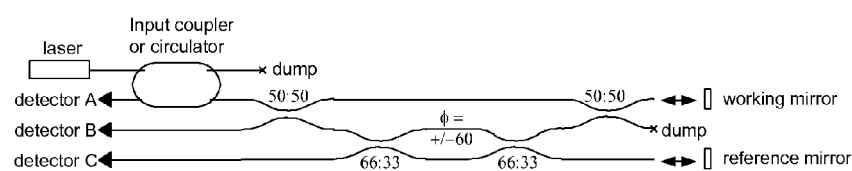
FIG. 68 is a schematic of a 3×3 system based on a 3×3 one hundred twenty degree planar evanescent coupler having four 2×2 subunit couplers.
Figure 69:
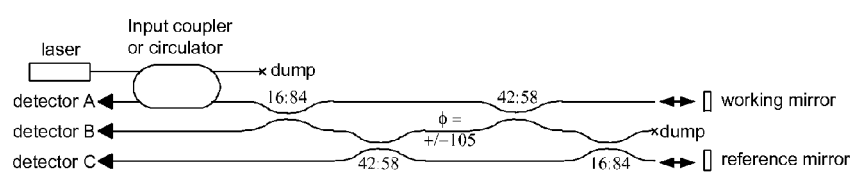
FIG. 69 is a schematic of a 3×3 system based on a 3×3 one hundred twenty degree planar evanescent coupler having four 2×2 subunit couplers.
Figure 70:
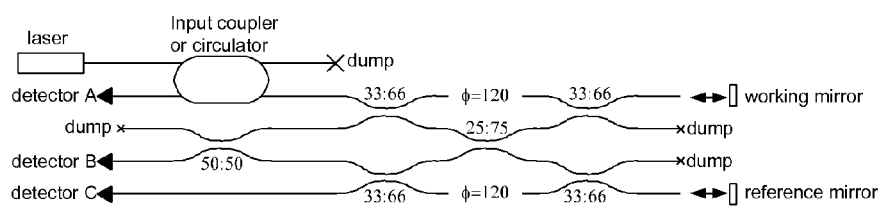
FIG. 70 is a 3×3 phase measurement system composed of 2×2 couplers and phase shifts, with an optional input coupler or circulator, according to a preferred embodiment of the invention.

FIG. 68 illustrates a 3×3 system based on a 3×3 one hundred twenty degree coupler composed of four 2×2 couplers (50:50 and 66:33) and the appropriate phase shifts of about sixty degrees. Such a system can use a circulator or the input coupler so that all three output beams can be collected for processing. Likewise FIG. 69 illustrates a similar system employing the variant 3×3 planar coupler composed of four 2×2 couplers (16:84 and 42:58) and its appropriate phase shift (about one hundred five degrees). Both of these systems could also be used without a circulator or input coupler if only two outputs are collected for processing. Likewise FIG. 70 illustrates a one hundred twenty degree 3×3 system composed of six 2×2 couplers and the appropriate phase shifts (about one hundred twenty degrees). A seventh coupler or a circulator forms the laser input if all three output signals are to be collected as shown. Alternatively, the circulator or coupler may be omitted if only two outputs are to be used.

Figure 71:
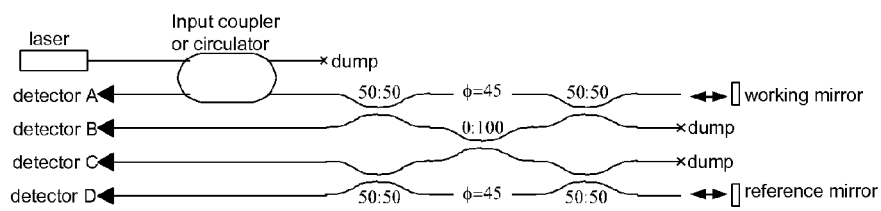
FIG. 71 is a schematic of a phase measurement system using a 4×4 coupler and an optional input coupler or circulator, according to a preferred embodiment of the invention.
Figure 72:
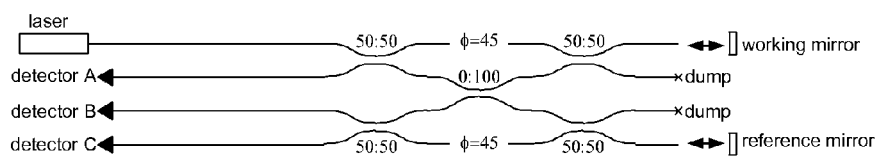
FIG. 72 is a schematic of a simplified phase measurement system using a 4×4 coupler, according to a preferred embodiment of the invention.

A system similar to that shown in FIG. 70 can be composed as a 4×4 system to produce four outputs each of which is ninety degrees out of phase with the adjacent output. This system is illustrated in FIG. 71. As before, such a system may employ a circulator or simply a coupler, or as shown in the figure, simply omit both if only three of the four possible outputs are collected for processing. A three output quadrature system is illustrated in FIG. 72.

Figure 73:
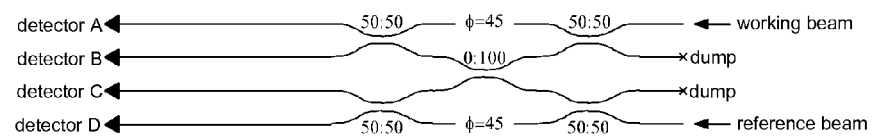
FIG. 73 is a schematic for a multi-port coupler in which the working and reference beams are powered by an external laser and splitter in a physically removed location from the multi-port phase measurement system.

All of the systems outlined in the preceding paragraphs have been of the style in which the laser light is fed into the working and reference beams through the multi-port coupler. This is not a necessity, of course. There may be many applications in which the working and reference beams are powered by an external laser and splitter in some physically removed location from the multi-port phase measurement system. In these cases, the phase measurement system simplifies to just the multi-port coupler and the N detectors connected to the outputs of the multi-port coupler as illustrated by way of example in FIG. 73. Any of the various multi-port phase measurement system configurations may be advantageously used in this manner.

In the preceding discussion, phase shifts were given with reference to ideal subunits and as stated, these ideal phase shifts are calculated when path length variations, non-adjacent waveguide coupling, and other effects are not taken into consideration. The other effects will be called self phase contributions and a brief description follows.

In an ideal 3×3 planar subunit, the phase velocities of the signals in all three waveguides are taken to be the same. This is the same as requiring the three eigenmodes of the coupled waveguides to have phase velocities that are different but equally spaced. This is in fact an idealization, because in any real planar subunit, any coupling between the waveguides that allows signal to be exchanged among them will cause a splitting of the eigenmode velocities, and this splitting is uneven. Stated another way, the speed of the signal in the center waveguide will be a bit different than the speed of the signal in the outer two waveguides. The exact speed difference depends on the index of refraction of the waveguide materials and the details of the waveguide dimensions and spacings.

The importance of this velocity difference is that it produces a phase shift between the signals in an outer waveguide and the inner waveguide which will increase in magnitude as the waveguide length is increased. So in addition to the phase shift caused by the accumulated transfer of light from one waveguide to another, an added phase shift will also appear due to the different speeds of propagation of the signals in the two waveguides. This added phase shift is what we call the self phase contributions.

In the claims, the relative phase shifts are comprised of the contributions from explicit phase shifting regions, path length variations, non-adjacent waveguide coupling, and to the small extent manifested, self phase contributions. It should also be noted that all claimed phase shifts can be applied to a waveform moving it forward or backward and only the magnitude is stated in the claims.

In the claims, as in the rest of the specification, we will specify 3×3 coupler lengths (also referred to as interaction lengths) in arbitrary length units in which a coupler length of about seven hundred eighty five such units couples fifty percent of the light across a 2×2 coupler.

The number of inputs and outputs to the optical couplers defined herein can be described as externally connected or internal. As stated in the background, we define n and m as the externally-connected number of inputs and outputs while we retain N and M for the internal number of inputs and outputs. N and M may not be equal to n and m, respectively, if one or more of the internal waveguides is terminated by any means (e.g. using a beam dump). It should also be noted that the terms "inputs" and "outputs" are used to conveniently refer to the optical connections present in a specific optical arrangement. It is appreciated that the connections we refer to as outputs can be used as inputs and the connections we refer to as inputs can be used as outputs. It is also appreciated that the use of terms like "connection" as in "optical connection" means that light is allowed to pass from one element to another. This may occur through any medium. Therefore, no implication is made that this passage of light necessarily occurs through a solid media or that the two elements are physically connected.

A preferred embodiment of the differential phase measurement system discussed above includes a laser input beam as the optical light source. High coherence length lasers provide advantages such as relaxed requirements on waveguide path lengths and on the working distance to a sample from the optical coupler. It is possible to use many of the claimed optical geometries and systems with other nearly monochromatic light sources. In fact, as long as light sources preferably possess a coherence length that is greater than the difference of the optical path lengths present in a given geometry, the claimed differential phase measurement systems can provide a meaningful phase measurement. Use of the terms "light," "optical," and "optics" (as in "optically connected") does not carry any implication that the electromagnetic radiation involved must be from the visible portion of the spectrum. The light can be of any wavelength.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A multi-port N-input, M-output, planar evanescent waveguide coupler, where M and N are each larger than two, the coupler including:
   at least two planar evanescent waveguide coupler subunits having interaction lengths, and
   at least three waveguides optically connecting the coupler subunits,
   wherein the interaction lengths of the at least two planar evanescent waveguide coupler subunits are selected so that at least two of the M-outputs have maximum intensity locations separated by about one hundred twenty degrees as a function of the phase difference.

2. A multi-port N-input, M-output, planar evanescent waveguide coupler, where M and N are each larger than two, the coupler including:
   at least two planar evanescent waveguide coupler subunits having interaction lengths, and
   at least three waveguides optically connecting the coupler subunits,
   wherein the interaction lengths are not equal.

3. A multi-port N-input, M-output, planar evanescent waveguide coupler, where M and N are each larger than two, the coupler including:
   at least two planar evanescent waveguide coupler subunits,
   at least three waveguides optically connecting the coupler subunits, and
   at least one phase shifting region disposed along at least one of the at least three waveguides,
   wherein the at least one phase shifting region includes a first phase shifting region selected so that at least two of the M-outputs have maximum intensity locations separated by about one hundred twenty degrees as a function of the phase difference.

4. A differential phase measurement system, comprising:
   a source of electromagnetic radiation,
   a multi-port N-input, M-output, planar evanescent waveguide coupler, where M and N are each larger than two, the coupler including,
      at least two planar evanescent waveguide coupler subunits having interaction lengths, and
      at least three waveguides optically connecting the coupler subunits,
   a detection system configured to detect at least two outputs, and
   a signal processing means,
   wherein the interaction lengths of the at least two planar evanescent waveguide coupler subunits are selected so that at least two of the M-outputs have maximum intensity locations separated by about one hundred twenty degrees as a function of the phase difference.

5. A differential phase measurement system, comprising:
   a source of electromagnetic radiation,
   a multi-port N-input, M-output, planar evanescent waveguide coupler, where M and N are each larger than two, the coupler including,
      at least two planar evanescent waveguide coupler subunits having interaction lengths, and
      at least three waveguides optically connecting the coupler subunits, a detection system configured to detect at least two outputs, and
   a signal processing means,
   wherein the interaction lengths are not equal.

6. A differential phase measurement system, comprising:
   a source of electromagnetic radiation,
   a multi-port N-input, M-output, planar evanescent waveguide coupler, where M and N are each larger than two, the coupler including,
      at least two planar evanescent waveguide coupler subunits, and
      at least three waveguides optically connecting the coupler subunits
   a detection system configured to detect at least two outputs,
   a signal processing means, and
   at least one phase shifting region disposed along at least one of the at least three waveguides,
   wherein the at least one phase shifting region includes a first phase shifting region selected so that at least two of the M-outputs have maximum intensity locations separated by about one hundred twenty degrees as a function of the phase difference.

* * * * *